US010878641B1

(12) United States Patent
Peterson et al.

(10) Patent No.: US 10,878,641 B1
(45) Date of Patent: Dec. 29, 2020

(54) EDITING BEZIER PATCH BY SELECTING MULTIPLE ANCHOR POINTS

(71) Applicant: Adobe Inc., San Jose, CA (US)

(72) Inventors: John W. Peterson, Menlo Park, CA (US); Hyunghwan Byun, Mountain View, CA (US)

(73) Assignee: Adobe Inc., San Jose, CA (US)

(*) Notice: Subject to any disclaimer, the term of this patent is extended or adjusted under 35 U.S.C. 154(b) by 0 days.

(21) Appl. No.: 16/435,029

(22) Filed: Jun. 7, 2019

(51) Int. Cl.
*G06T 19/20* (2011.01)
*G06T 17/20* (2006.01)
*G06T 7/149* (2017.01)
*G06T 3/00* (2006.01)

(52) U.S. Cl.
CPC ............ *G06T 19/20* (2013.01); *G06T 3/0006* (2013.01); *G06T 7/149* (2017.01); *G06T 17/205* (2013.01); *G06T 2207/20021* (2013.01); *G06T 2210/12* (2013.01); *G06T 2210/56* (2013.01); *G06T 2219/2016* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,459,439 B1* | 10/2002 | Ahlquist, Jr. | ......... | G06T 11/203 345/619 |
| 6,608,631 B1* | 8/2003 | Milliron | .................. | G06T 13/00 345/619 |
| 6,919,888 B1* | 7/2005 | Perani | ..................... | G06T 17/20 345/420 |
| 7,385,612 B1* | 6/2008 | Peterson | ................. | G06T 11/60 345/619 |
| 7,616,782 B2* | 11/2009 | Badawy | .................. | G06T 9/001 382/107 |
| 7,843,467 B2* | 11/2010 | Zhou | ..................... | G06T 3/0093 345/619 |

(Continued)

OTHER PUBLICATIONS

Sederberg et al., Free-Form Deformation of Solid Geometric Models, Aug. 18-22, 1986, ACM, vol. 20, No. 4, pp. 151-160 (Year: 1986).*

(Continued)

*Primary Examiner* — Motilewa Good Johnson
(74) *Attorney, Agent, or Firm* — Finch & Maloney PLLC

(57) ABSTRACT

Techniques are disclosed for deforming an image using Bezier transformation. The image is divided in a plurality of sections. Each section represents a corresponding Bezier patch. Each section comprises a multiple control points for Bezier transformation, with corner control points of the sections forming anchor points. The deformation of the image is performed by selecting multiple anchor points, and interacting with the selected anchor points. A bounding box that includes the selected anchor points is displayed. Translating, rotating, and/or scaling the selected anchor points based on user input relative to the bounding box results in corresponding Bezier transformation of portion of the image within the bounding box. Thus, instead of having to interact with one control point at a time to deform the image, the desired deformation is achieved by selecting multiple anchor points, and applying the Bezier deformation to the whole bounding box defined by the selected anchor points.

20 Claims, 12 Drawing Sheets

(56) References Cited

U.S. PATENT DOCUMENTS

| | | | |
|---|---|---|---|
| 7,936,352 B2* | 5/2011 | Baran | G06T 19/20 |
| | | | 345/420 |
| 8,063,917 B2* | 11/2011 | Igarashi | G06T 3/0093 |
| | | | 345/647 |
| 8,760,467 B2 | 6/2014 | Peterson | |
| 9,250,786 B2* | 2/2016 | Stone | G06F 3/04883 |
| 9,685,143 B2* | 6/2017 | Sato | G06T 3/0093 |
| 2002/0089500 A1* | 7/2002 | Jennings, Jr. | G06F 3/0484 |
| | | | 345/420 |
| 2003/0098872 A1* | 5/2003 | Georgiev | G06T 3/0093 |
| | | | 345/647 |
| 2008/0143711 A1* | 6/2008 | Zhou | G06T 3/0093 |
| | | | 345/420 |
| 2010/0214312 A1* | 8/2010 | Weber | G06T 13/80 |
| | | | 345/593 |
| 2013/0093784 A1* | 4/2013 | Budhiraja | G06T 5/002 |
| | | | 345/611 |
| 2014/0104266 A1* | 4/2014 | Stone | G06F 30/00 |
| | | | 345/419 |
| 2014/0146039 A1* | 5/2014 | Duplessis | G06F 3/04845 |
| | | | 345/419 |
| 2015/0178889 A1* | 6/2015 | Michel | G06T 3/40 |
| | | | 382/298 |
| 2016/0092409 A1* | 3/2016 | Le Henaff | G06F 40/109 |
| | | | 715/269 |
| 2016/0163068 A1* | 6/2016 | Uemura | G06T 17/30 |
| | | | 382/286 |
| 2017/0294032 A1* | 10/2017 | Mantuano | G06T 11/40 |

OTHER PUBLICATIONS

Barrett et al., Object-Based Image Editing, 2002, ACM, pp. 777-784 (Year: 2002).*

Meng et al., Interactive Image Deformation Using Cage Coordinates on GPU, Dec. 14-15, 2009, ACM, pp. 119-126 (Year: 2009).*

Arad et al., Image Warping Using Few Anchor Points and Radial Functions, Computer Graphics forum, vol. 14, 1995, pp. 35-46 (Year: 1995).*

U.S. Appl. No. 16/141,276, filed Sep. 25, 2018.

U.S. Appl. No. 15/996,115, filed Jun. 1, 2018.

U.S. Appl. No. 15/996,131, filed Jun. 1, 2018.

* cited by examiner

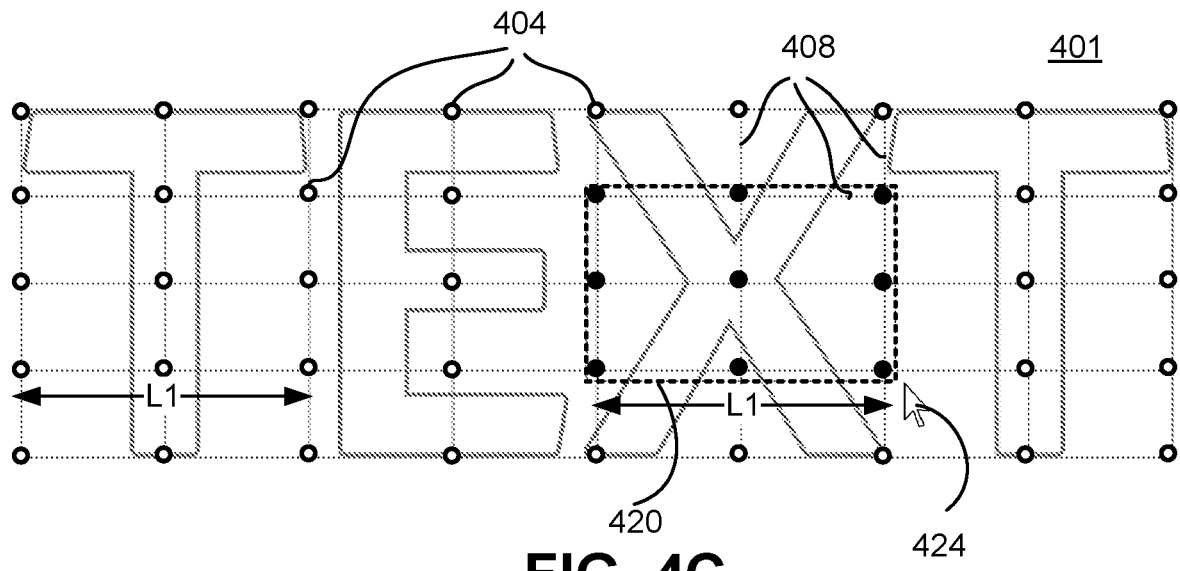
FIG. 4C
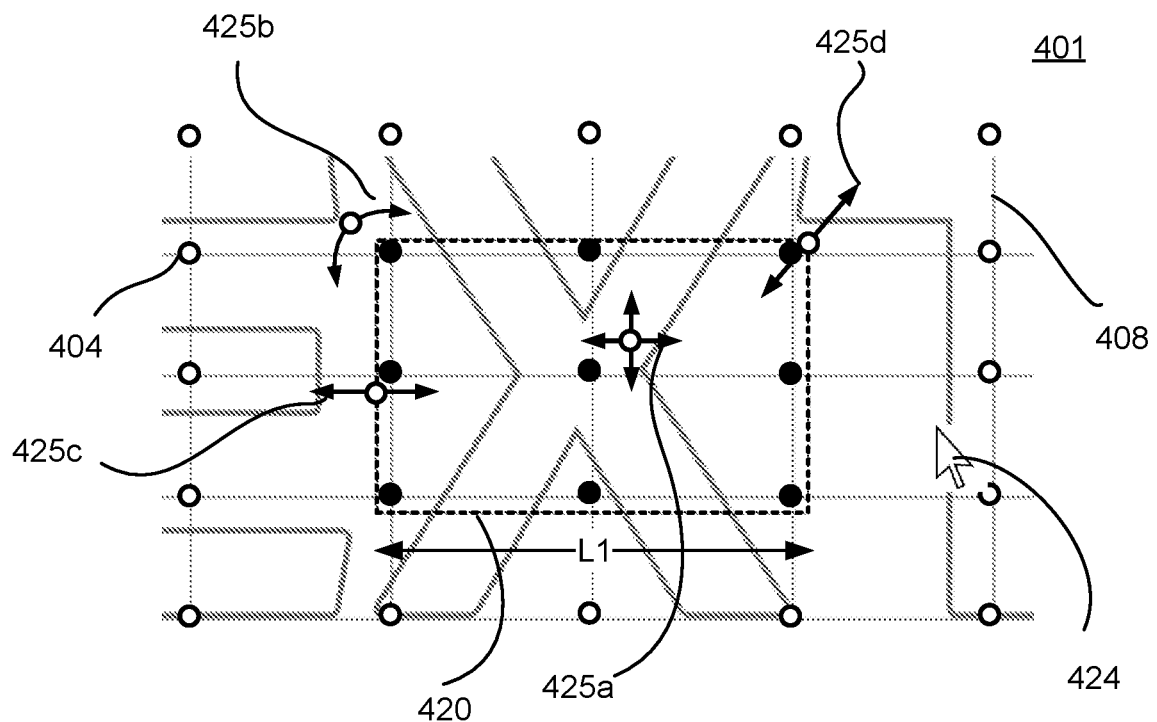
FIG. 4D1

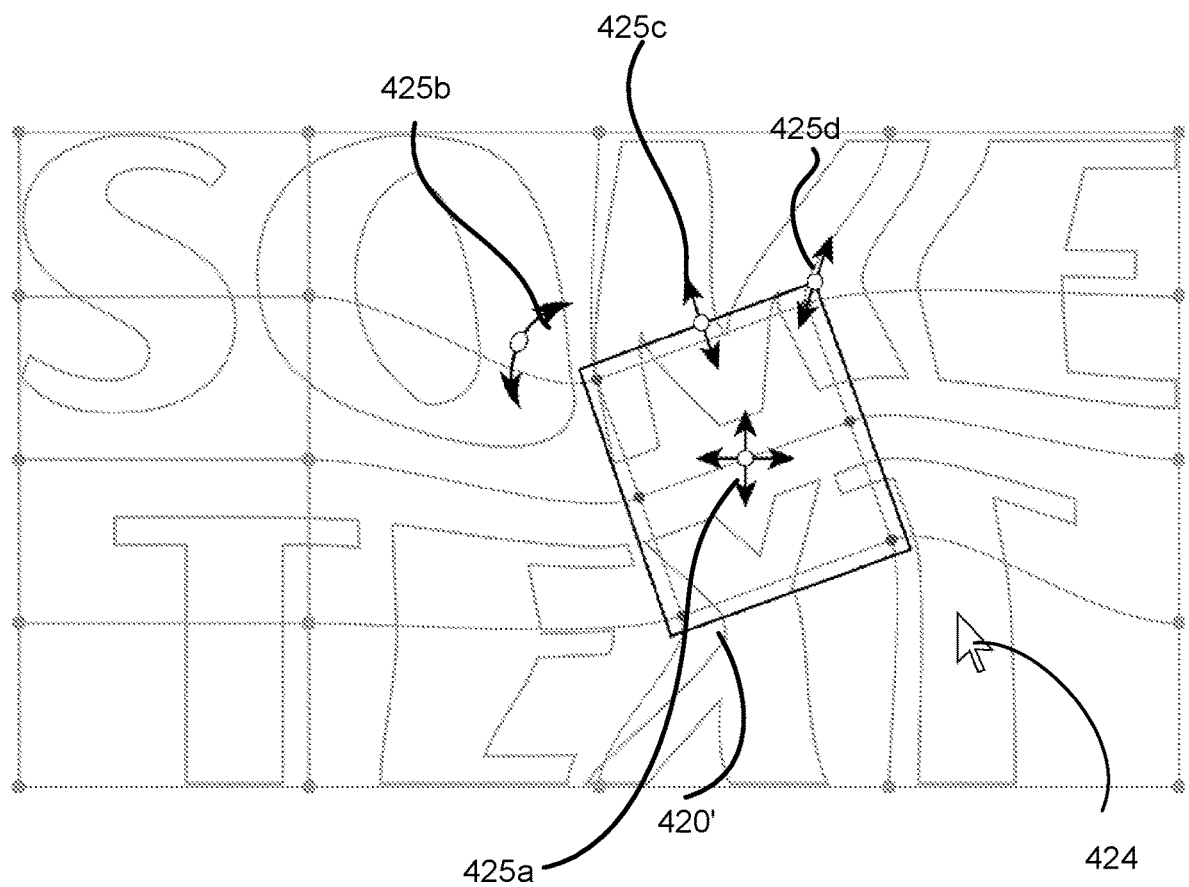
FIG. 4D2

EDITING BEZIER PATCH BY SELECTING MULTIPLE ANCHOR POINTS

FIELD OF THE DISCLOSURE

This disclosure relates to techniques for deforming Bezier patches within an image. In particular, this disclosure relates to deforming a Bezier patch by selecting and manipulating two or more anchor points associated with the Bezier patch.

BACKGROUND

Over the last several years, developers have created hardware and software platforms for creating and manipulating digital images. These platforms allow computing systems to manipulate digital images in a variety of ways, to modify one or more characteristics of the images, and then save or share the edited digital images. Some image editing systems can edit a raster image or vector image by warping or otherwise deforming the image via control points (e.g., in a Bezier patch or a Bezier curve) corresponding to the digital image. A Bezier patch (e.g., which may represent a section or a "patch" of an image) has a plurality of associated control points, and changing a position of a control point causes a deformation of the patch. Thus, the control points can be individually moved to get a desired deformation of the image. However, moving individual control points, one at a time, to achieve the desired deformation of the image is non-trivial. This problem is exacerbated as the complexity of the artwork increases. Moreover, while deformations limited to a small or local portion of a given image may be relatively easier to implement, it remains quite difficult to implement higher-level changes to artwork where the given deformation has a global impact on the image.

BRIEF DESCRIPTION OF THE DRAWINGS

FIGS. 4A, 4B, 4C, 4D1, 4E, 4F, and 4G illustrate an image and various operations associated with deforming the image, in accordance with some embodiments of the present disclosure. FIG. 4B further illustrates an example User Interface that allows a user to select a number of rows and columns of patches in which an image is to be divided, to perform Bezier deformation of the image, in accordance with some embodiments of the present disclosure. FIG. 4D2 illustrates another example image, an example bounding box, example types of deformation and corresponding cursor locations, in accordance with some embodiments of the present disclosure.

DETAILED DESCRIPTION

Figure 1:
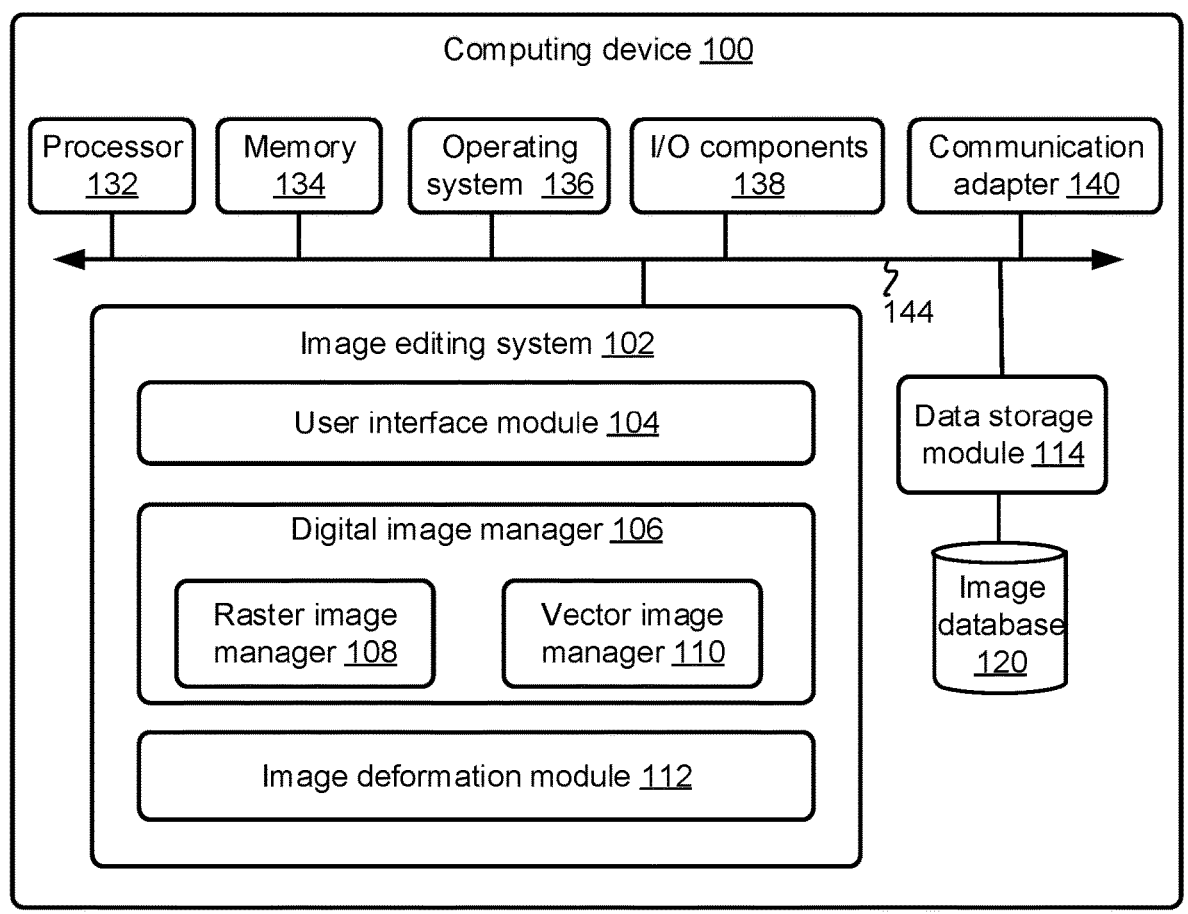
FIG. 1 is a block diagram schematically illustrating selected components of an example computing device configured to deform an image, based on selection and manipulation of multiple anchor points associated with the image, in accordance with some embodiments of the present disclosure.

Techniques are disclosed for deforming an image using Bezier transformation. The techniques focus on moving multiple selected anchor points based on user input, with the surrounding control points correspondingly and automatically being manipulated to preserve connectivity and continuity between the Bezier patches used for deforming the image. Thus, a given local portion of an image is readily deformed, and the impact (if any) of the local deformation is readily translated into the overall high level or global image. As will be appreciated in light of this disclosure, such techniques are particularly helpful with respect to complex images where a local deformation impacts the image on a global scale.

In some embodiments, to deform an image, the image is segmented into a plurality of segments or patches. In an example, a patch may be a Bezier patch, such as a cubic or bicubic Bezier patch. Bezier surfaces or patches are a species of mathematical spline used in computer graphics, computer-aided design, finite element modeling, etc. As with the Bezier curve, a Bezier surface or patch is defined by a set of control points. In such an example, the image is segmented into multiple Bezier patches, to provide better control when deforming or warping the image. A Bezier patch has a plurality of associated control points. Moving one or more control points result in translation, modification or deformation of the corresponding Bezier patch. As used herein, in addition to its plain and ordinary meaning, the term control point refers to an interaction point on a Bezier patch that determines a shape of the Bezier patch. The control points of a Bezier patch include: (1) edge control points that are on edges or boundaries of the Bezier patch, (2) corner control points that are on corners of the Bezier patch, and (3) intermediate control points that are within the Bezier patch. Modifying the position of a single control point changes curves (e.g., vertically and horizontally) within the patch. The corner control points are also referred to as "anchor points" herein.

In an example embodiment, the image is displayed, along with boundaries of the patches of the images and the anchor points. For example, a bicubic Bezier patch is defined by 16 control points arranged in a 4×4 grid. The corner control points (e.g., control points on four corners of the patch) are considered as "anchor points"—there are four anchor points defining a bicubic Bezier patch. Two adjacent patches share control points and anchor points along their adjoining boundary. In an example, the anchor points are made visible in a user interface, along with the image and the boundaries of the patches.

The number of patches used to define the deformation can be user specified or can be system selected. As discussed, a corner of a patch forms a corresponding anchor point. A user selects two or more anchor points. For example, if the user desires to deform a patch, the user selects one or more anchor points of the patch. In another example, if the user desired to deform two adjacent patches, the user selects all the anchor points of the two patches (or at least the anchor points that are in the corners of an area defined by the two adjacent patches). In another example, the user selects anchor points of areas of the image the user desires to deform. In yet another example, the user selects random anchor points of the image, e.g., to randomize the deformation of the image. Deforming an image involves deforming one or more Bezier patches of the image, as will be discussed in further detail later. Deforming a Bezier patch involves, for example, scaling the Bezier patch (e.g., uniform or non-uniform scaling), rotating the Bezier patch, moving the Bezier patch, and/or the like.

Selection of the anchor points is done, for example, by a user input involving a click-hold-and-drag action of a mouse or a track-pad, or a touch-screen press-hold-and-drag action, although other anchor point selection techniques will be apparent. In any such cases, multiple anchor points are selected based on the "drag" action of the user input. In another example use case, the user selects individual anchor points by, for example, a mouse click, or touchscreen tap action. In any case, note that the selection may be a selection of contiguous and/or non-contiguous anchor points.

Once the target anchor points are selected, a bounding box surrounding the selected anchor points is displayed. For example, the bounding box is overlaid on the image, and the visual indication of the bounding box provides the user with an indication of an area within the image that is to be deformed. In an example, the bounding box covers a two-dimensional area (e.g., if the selected anchor points are not co-linear or otherwise define an interior area). In another example, the bounding box covers merely a single dimensional line (e.g., if the selected anchor points are co-linear and don't define an interior area). In yet another example, even if the selected anchor points are co-linear, the bounding box covers a two-dimensional area (e.g., the bounding box has a relatively low width, and a length defined by the selected anchor points).

The user interacts with the bounding box, causing deformation of the image portion within bounding box, as well as areas adjacent and outside the bounding box. For example, if the user clicks (or presses) and drags a corner of the bounding box (i.e., drags an anchor point of the bounding box), a uniform scaling of the image portion covered by the bounding box is performed. There is a smooth transition between the deformed area and the non-deformed area (e.g., continuity, connectivity and collinearity of the image is maintained across the boundary of the bounding box, even after the deformation). In another example, if the user clicks (or presses) and drags an edge (e.g., a center of an edge) of the bounding box, a non-uniform scaling of the image portion covered by the bounding box is performed. In yet another example, if the user clicks (or presses) and drags an inside section of the bounding box, a translation or linear movement of the image portion covered by the bounding box is performed. In another example, if the user clicks (or presses) and drags an area outside but near a corner of the bounding box, a rotation of the image portion covered by the bounding box is performed. In a more general sense, a detection of user input that indicates a user's desire to drag can be triggered by any number of user inputs.

In an embodiment, the uniform scaling, non-uniform scaling, translation, rotation, or any other type of deformation discussed herein can be implemented with Bezier deformations. Other comparable deformations may be used as well. In any such cases, the image portion covered by the bounding box is deformed (e.g., scaled, translated, rotated, etc.) such that parametric continuity, connectivity and collinearity of the image is maintained across the boundary of the bounding box, even after the deformation. Thus, in an example, the deformation is a type of affine transformation. For example, affine transformation preserves collinearity (e.g., all points lying on a line initially still lie on a line after transformation) and/or ratios of distances (e.g., the midpoint of a line segment remains the midpoint after transformation). In another example, the deformation may not be limited to affine transforms—other transforms, such as skew or perspective, may be applied as well. In an example, to maintain continuity, connectivity and collinearity of the image across the boundary of the bounding box, not only the section of the image covered by the bounding box is deformed, but also adjacent sections and other impacted sections outside the bounding box are correspondingly deformed.

In an example embodiment, deforming the image within and outside the bounding box involves moving and/or rotating the underlying control points, e.g., at the same time or together. For example, control points within the bounding box are moved to cause the deformation, and control points outside the bounding box are also moved to maintain continuity, connectivity and collinearity of the image across the boundary of the bounding box. Thus, the user can change multiple control points with a single user input action, which is much faster, efficient, and user friendly than moving individual control points, one at a time.

System Architecture

FIG. 1 is a block diagram schematically illustrating selected components of an example computing device 100 (also referred to as device 100) configured to deform an image, based on selection and manipulation of multiple anchor points associated with the image, in accordance with some embodiments. As can be seen, the device 100 includes an image editing system 102, which is capable of providing a user with options to select two or more anchor points in an image and manipulate the anchor points to deform the image. As will be appreciated, the configuration of the device 100 may vary from one embodiment to the next. To this end, the discussion herein will focus more on aspects of the device 100 that are related to facilitating deformation of images, and less so on standard componentry and functionality typical of computing devices.

The device 100 can comprise, for example, a desktop computer, a laptop computer, a workstation, an enterprise class server computer, a handheld computer, a tablet computer, a smartphone, a set-top box, a game controller, and/or any other computing device that can display images and allow a user to deform the images.

In the illustrated embodiment, the device 100 includes one or more software modules configured to implement certain of the functionalities disclosed herein, as well as hardware configured to enable such implementation. These hardware and software components may include, among other things, a processor 132, memory 134, an operating system 136, input/output (I/O) components 138, a communication adaptor 140, data storage module 114, and the image editing system 102. An image database 120 (e.g., that comprises a non-transitory computer memory) comprises multiple original and/or edited (e.g., deformed) images, and is coupled to the data storage module 114. A bus and/or interconnect 144 is also provided to allow for inter- and intra-device communications using, for example, communication adaptor 140. Note that in an example, components like the operating system 136 and the image editing system 102 can be software modules that are stored in memory 132 and executable by the processor 132. In an example, at least sections of the image editing system 102 can be implemented at least in part by hardware, such as by Application-Specific Integrated Circuit (ASIC). The bus and/or interconnect 144 is symbolic of all standard and proprietary technologies that allow interaction of the various functional components shown within the device 100, whether that interaction actually take place over a physical bus structure or via software calls, request/response constructs, or any other such inter and intra component interface technologies.

Processor 132 can be implemented using any suitable processor, and may include one or more coprocessors or controllers, such as an audio processor or a graphics processing unit, to assist in processing operations of the device 100. Likewise, memory 134 can be implemented using any suitable type of digital storage, such as one or more of a disk drive, solid state drive, a universal serial bus (USB) drive, flash memory, random access memory (RAM), or any suitable combination of the foregoing. Operating system 136 may comprise any suitable operating system, such as Google Android, Microsoft Windows, or Apple OS X. As will be appreciated in light of this disclosure, the techniques provided herein can be implemented without regard to the particular operating system provided in conjunction with device 100, and therefore may also be implemented using any suitable existing or subsequently-developed platform. Communication adaptor 140 can be implemented using any appropriate network chip or chipset which allows for wired or wireless connection to a network and/or other computing devices and/or resource. The device 100 also include one or more I/O components 138, such as one or more of a tactile keyboard, a display, a mouse, a touch sensitive display, a touch-screen display, a trackpad, a microphone, a camera, scanner, and location services. In general, other componentry and functionality not reflected in the schematic block diagram of FIG. 1 will be readily apparent in light of this disclosure, and it will be appreciated that the present disclosure is not intended to be limited to any specific hardware configuration. Thus, other configurations and subcomponents can be used in other embodiments.

Also illustrated in FIG. 1 is the image editing system 102 implemented on the device 100. In an example embodiment, the system 102 includes a user interface module 104, a digital image manager 106 including a raster image manager 108 and a vector image manager 110, and an image deformation module 112. In an example, the components of the system 102 are in communication with one another or other components of the device 102 using the bus and/or interconnect 144, as previously discussed. The components of the system 102 can be in communication with one or more other devices including other computing devices of a user, server devices (e.g., cloud storage devices), licensing servers, or other devices/systems. Although the components of the system 102 are shown separately in FIG. 1, any of the subcomponents may be combined into fewer components, such as into a single component, or divided into more components as may serve a particular implementation.

In an example, the components of the system 102 performing the functions discussed herein with respect to the system 102 may be implemented as part of a stand-alone application, as a module of an application, as a plug-in for applications, as a library function or functions that may be called by other applications, and/or as a cloud-computing model. Thus, the components of the system 102 may be implemented as part of a stand-alone application on a personal computing device or a mobile device. Alternatively, or additionally, the components of the image editing system 102 may be implemented in any application that allows digital content editing, including, but not limited to, ADOBE® ILLUSTRATOR®, ADOBE PHOTOSHOP®, and ADOBE® AFTER EFFECTS® software. "ADOBE," "ILLUSTRATOR," "PHOTOSHOP," and "AFTER EFFECTS" are registered trademarks of Adobe Systems Incorporated in the United States and/or other countries.

As discussed, the system 102 includes a user interface module 104 to facilitate generation and display of content, such as images, within a user interface (UI) of one or more applications on a display of the device 102. The user interface module 104 allows a user to view, interact and/or modify with digital content displayed in a UI, where the digital content includes images that can be edited or deformed by the user. For instance, the user interface manager 1204 can display tools or controls to allow the user to display, modify and/or other interact with Bezier patches of an image, anchor points associated with the Bezier patches, configure parameters of the Bezier patches, etc., to deform the image in one or more ways, as discussed in further detail in turn. The image to be deformed can include raster content and/or vector content. Two or more selected anchor points of Bezier patches of the image are moved, e.g., to deform the corresponding Bezier patches, thereby deforming the image, as discussed in further detail herein later.

The system 102 also includes a digital image manager 106 to facilitate the management of images within the system 102. For example, the digital image manager 106 can manage processes for handling a variety of images. The digital image manager 106 communicates with the user interface module 104 to allow the user interface manager 104 to properly display digital content, such as images, within a user interface. Additionally, the digital image manager 106 communicates with the data storage module 114 to access digital content stored in the image database 120.

In an example embodiment, the digital image manager 106 includes a raster image manager 108 for handling raster image content. Specifically, the raster image manager 108 allows the user interface module 104 to display raster images within a pixel grid of (x, y) dimensions. Additionally, the raster image manager 108 facilitates the segmentation of raster images in connection with a deformation operation. The raster image manager 108 thus assists the image deformation module 112 during a deformation operation of a raster image to accurately apply parametric deformations to separate portions of the raster image and then recombine the portions for creating a deformed raster image.

In an example embodiment, the digital image manager 106 also includes a vector image manager 110 for handling vector image content. In particular, the vector image manager 110 allows the user interface module 104 to display vector images based on characteristics applied to vector paths/segments. For instance, the vector image manager 110 translates end point and direction information into pixel coordinates on a display device for the user interface module 104. The vector image manager 110 also communicates with the image deformation module 112 to facilitate segmentation of vector portions during a deformation operation by performing mathematical calculations for computing locations of vector segments within deformation regions. Likewise, the vector image module 110 facilitates recombination of a plurality of vector segments according to predefined tolerances in response to a request to deform one or more of the vector segments. In an example, vector content may be specified by mathematical curves, such as Bezier curves.

In an example embodiment, the system 102 also includes the image deformation module 112 to facilitate Bezier deformations of digital images. In an example, the image deformation module 112 generates a plurality of patches (e.g., Bezier patches that are part of a Bezier quilt) of an image during a deformation operation on a digital image or digital text. The Bezier quilt comprises a plurality of bicubic Bezier patches, for example. The image deformation module 112 also specifies the deformations of one or more patches, based on user selection and manipulation of two or more anchor points, as discussed in further detail below. The image deformation module 112 can also communicate with other components of the system 102 to determine on which portions of digital image to perform the deformations and to recombine the portions into modified or deformed a digital image.

The content editing system 1200 also includes a data storage manager 114 (that comprises a non-transitory computer memory) that stores and maintains data associated with deforming digital content using a plurality of Bezier patches. For example, the data storage manager 1214 is coupled to the database 120 that stores digital content (e.g., digital images or digital text), content portions corresponding to Bezier patches in a deformation operation, and deformation information for one or more portions. Additionally, the data storage manager 114 can store information associated with recombining the portions, including any deformations, to create a modified digital image. The data storage manager 114 then stores the modified or deformed digital image.

Figure 2:
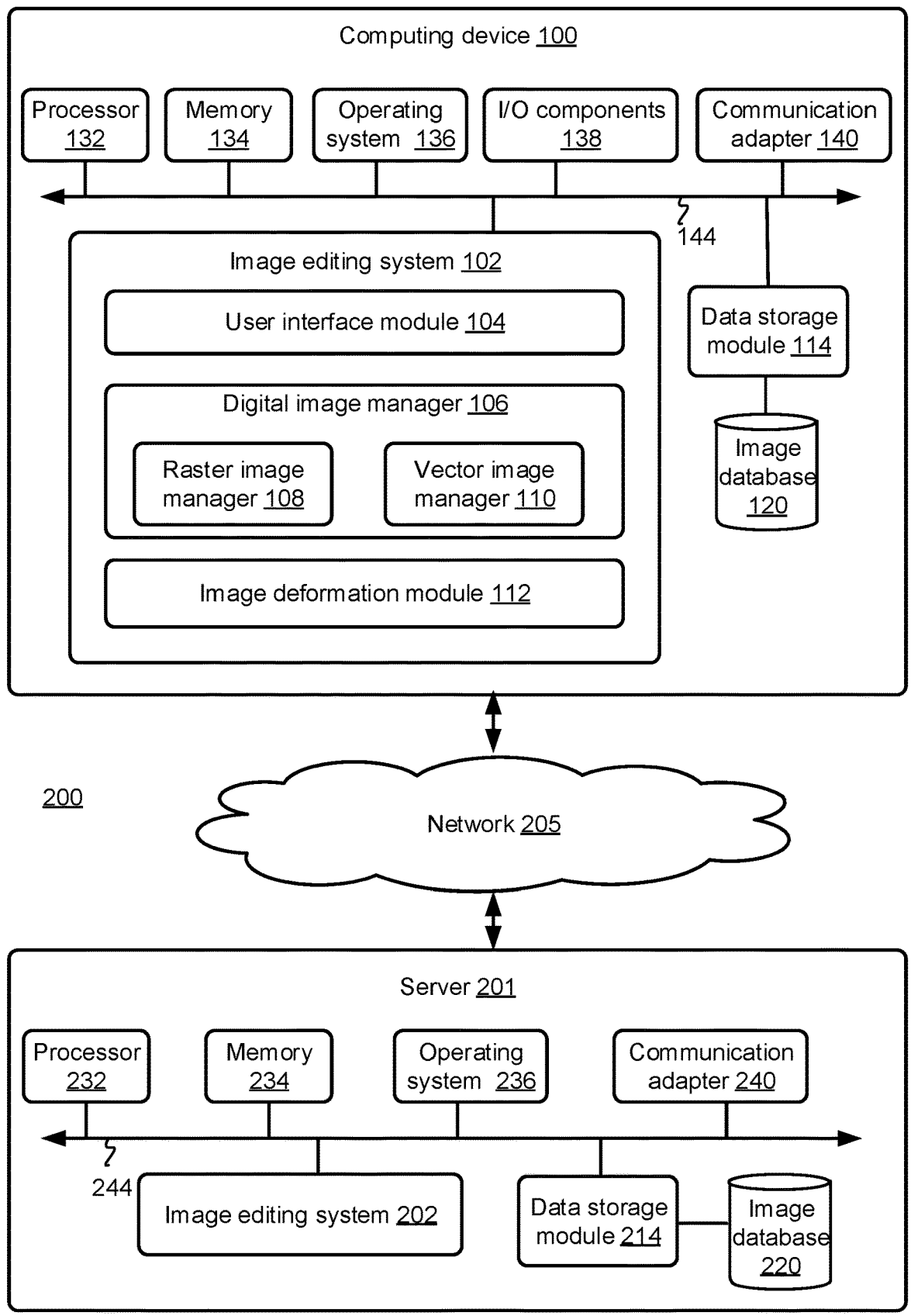
FIG. 2 is a block diagram schematically illustrating selected components of an example system comprising a computing device communicating with server device(s), where the combination of the computing device and the server device(s) are configured to deform an image, based on selection and manipulation of multiple anchor points associated with the image, in accordance with some embodiments of the present disclosure.

FIG. 2 is a block diagram schematically illustrating selected components of an example system 200 comprising the computing device 100 of FIG. 1 communicating with server device(s) 201, where the combination of the device 100 and the server device(s) 201 (henceforth also referred to generally as server 201) are configured to deform an image, based on selection and manipulation of multiple anchor points associated with the image, in accordance with some embodiments.

In an example, the communication adaptor 140 of the device 100 can be implemented using any appropriate network chip or chipset allowing for wired or wireless connection to network 205 and/or other computing devices and/or resources. To this end, the device 100 is coupled to the network 205 via the adaptor 140 to allow for communications with other computing devices and resources, such as the server 201. The network 205 is any suitable network over which the computing devices communicate. For example, network 205 may be a local area network (such as a home-based or office network), a wide area network (such as the Internet), or a combination of such networks, whether public, private, or both. In some cases, access to resources on a given network or computing system may require credentials such as usernames, passwords, or any other suitable security mechanism.

In one embodiment, the server 201 comprises one or more enterprise class devices configured to provide a range of services invoked to provide image deformation services, as variously described herein. Examples of such services include receiving from the device 100 input indicating a type and an extent of deformation performed on a patch of an image, deforming the image, and transmitting the deformed image to the device 100 for displaying on the device 100, as explained below. Although one server 201 implementation image deformation function is illustrated in FIG. 2, it will be appreciated that, in general, tens, hundreds, thousands, or more such servers can be used to manage an even larger number of image deformation functions.

In the illustrated embodiment, the server 201 includes one or more software modules configured to implement certain of the functionalities disclosed herein, as well as hardware configured to enable such implementation. These hardware and software components may include, among other things, a processor 232, memory 234, an operating system 236, an image editing system 202 (also referred to as system 202), data storage module 214, and a communication adaptor 240. An image database 220 (e.g., that comprises a non-transitory computer memory) comprises multiple original and/or edited (e.g., deformed) images, and is coupled to the data storage module 214. A bus and/or interconnect 244 is also provided to allow for inter- and intra-device communications using, for example, communication adaptor 240 and/or network 205. Note that components like the operating system 236 and image editing system 202 can be software modules that are stored in memory 234 and executable by the processor 232. The previous relevant discussion with respect to the symbolic nature of bus and/or interconnect 144 is equally applicable here to bus and/or interconnect 244, as will be appreciated.

Processor 232 is implemented using any suitable processor, and may include one or more coprocessors or controllers, such as an audio processor or a graphics processing unit, to assist in processing operations of the server 201. Likewise, memory 234 can be implemented using any suitable type of digital storage, such as one or more of a disk drive, a universal serial bus (USB) drive, flash memory, random access memory (RAM), or any suitable combination of the foregoing. Operating system 236 may comprise any suitable operating system, and the particular operation system used is not particularly relevant, as previously noted. Communication adaptor 240 can be implemented using any appropriate network chip or chipset which allows for wired or wireless connection to network 205 and/or other computing devices and/or resources. The server 201 is coupled to the network 205 to allow for communications with other computing devices and resources, such as the device 100. In general, other componentry and functionality not reflected in the schematic block diagram of FIG. 2 will be readily apparent in light of this disclosure, and it will be further appreciated that the present disclosure is not intended to be limited to any specific hardware configuration. In short, any suitable hardware configurations can be used.

The server 201 can generate, store, receive, and transmit any type of data, including graphical content such as digital images (e.g., raster images or vector images). As shown, the server 201 includes the image editing system 202 that communicates with the system 102 on the client device 100. In an example, the image editing features discussed with respect to FIG. 1 can be implemented in FIG. 2 exclusively by the image editing system 102, exclusively by the image editing system 202, and/or may be shared between the image editing systems 102 and 202. Thus, in an example, none, some, or all image editing features, including image deformation features, are implemented by the image editing system 202.

For example, when located in the server 201, the image editing system 202 comprise an application running on the server 201 or a portion of a software application that can be downloaded to the device 100. For instance, the system 102 can include a web hosting application allowing the device 100 to interact with content from the image editing system 202 hosted on the server 201. In this manner, the server 201 generates and/or modifies raster image content or vector segments based on the digital content and user interaction within a graphical user interface provided to the device 100.

Thus, the location of some functional modules in the system 200 may vary from one embodiment to the next. For instance, while image deformation module 112 is shown on the client side in this example case, it may be on the server side (e.g., within the image editing system 202) in other embodiments. Any number of client-server configurations will be apparent in light of this disclosure. In still other embodiments, the techniques may be implemented entirely on a user computer, e.g., simply as stand-alone image modification application. Similarly, while the image database 120 is shown on the client side in this example case, it may be on the server side in other embodiments, such as the cloud-based image database 220. Thus, the database of the original and modified images can be local or remote to the device 102, so long as it is accessible by the image deformation module 112 that is implemented by the image editing system 102 or implemented by the image editing system 202.

Example Operation

Figure 3A:
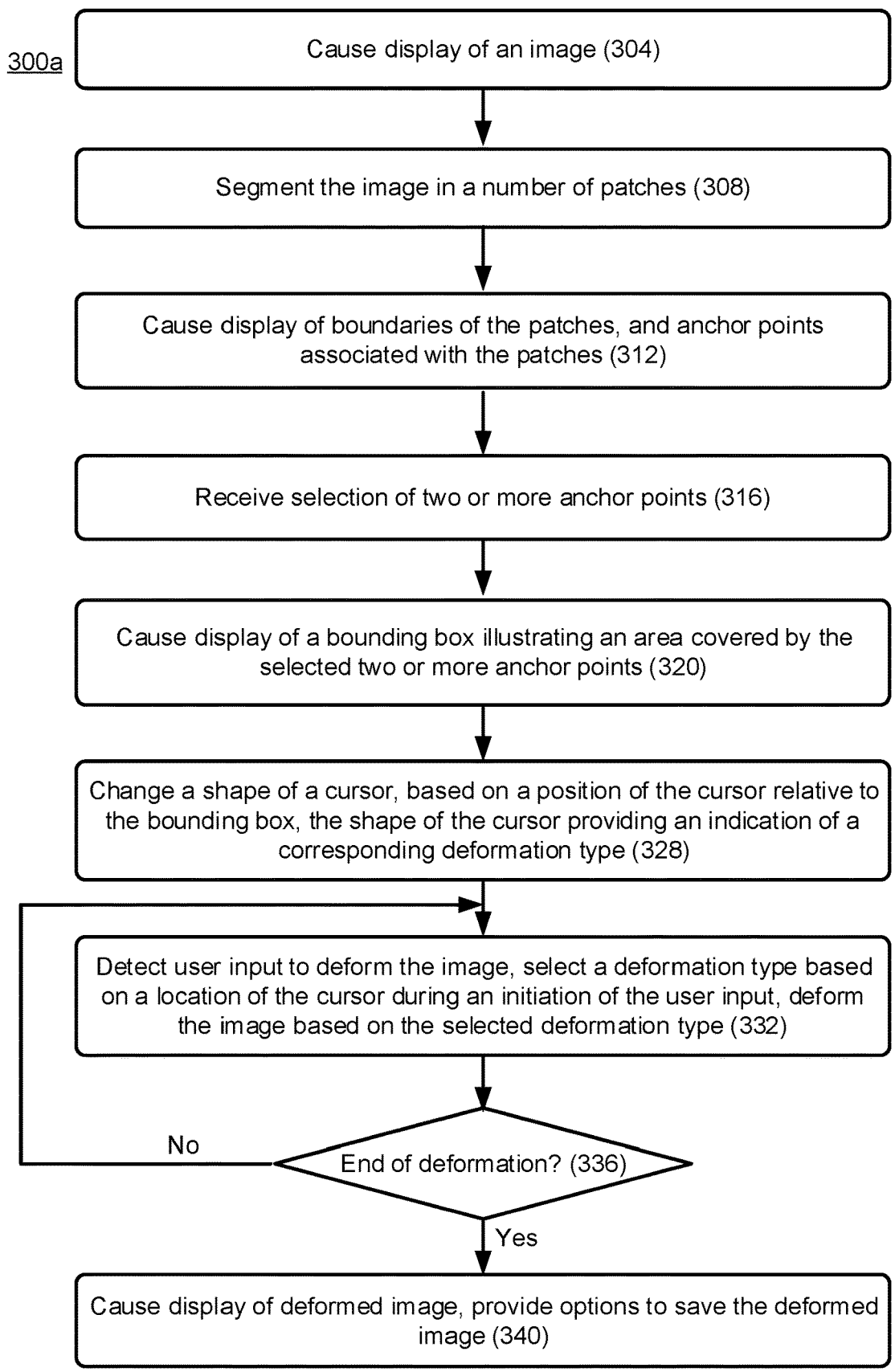
FIG. 3A is a flowchart illustrating an example method for deforming an image, based on selecting and manipulating multiple anchor points of the image, in accordance with some embodiments of the present disclosure.

FIG. 3A is a flowchart illustrating an example method 300a for deforming an image, based on selecting and manipulating multiple anchor points of the image, in accordance with some embodiments. Method 300a can be implemented, for example, using the system architecture illustrated in FIGS. 1 and/or 2, and described herein. However other system architectures can be used in other embodiments, as apparent in light of this disclosure. To this end, the correlation of the various functions shown in FIG. 3A to the specific components and functions illustrated in FIGS. 1 and 2 is not intended to imply any structural and/or use limitations. Rather, other embodiments may include, for example, varying degrees of integration wherein multiple functionalities are effectively performed by one system. In another example, multiple functionalities may be effectively performed by more than one system. For example, in an alternative embodiment, a first server may facilitate displaying on an image, and a second server may provide functionality associated with deforming the image. In yet another embodiment, a client device (such as device 100, instead of a server) may display the image and/or may provide also functionality associated with deforming the image. Thus, although various operations of the method 300a are discussed herein as being performed by the image editing system 102 of the computing device 100, one or more of these operations can also be performed by the image editing system 202 of the server 201 as well.

While FIG. 3A illustrates the method 300a for deforming an image, FIGS. 4A-4G illustrates an image 400 and various operations associated with deforming the image, in accordance with some embodiments. FIGS. 3A and 4A-4G will be discussed herein in unison.

Figure 4A:
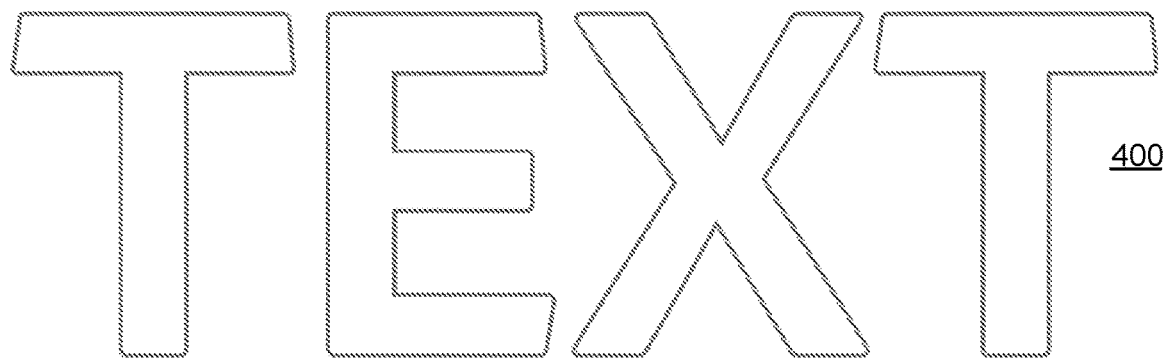

The method 300a comprises, at 304, causing display of an image on a display screen of the device 100. For example, FIG. 4A illustrates an image 400 being displayed on the display screen of the device 100. The image 400 includes the word "TEXT," which is merely an example. The image 400 can be any type of vector content and/or raster content. That is, the image 400 can be a vector image or a raster image. For example, the digital image manager 106 (e.g., the raster image manager 108 or the vector image manager 110, depending on whether the image is a raster image or a vector image) causes and/or facilitates displaying the image on the display screen.

Figure 4B:
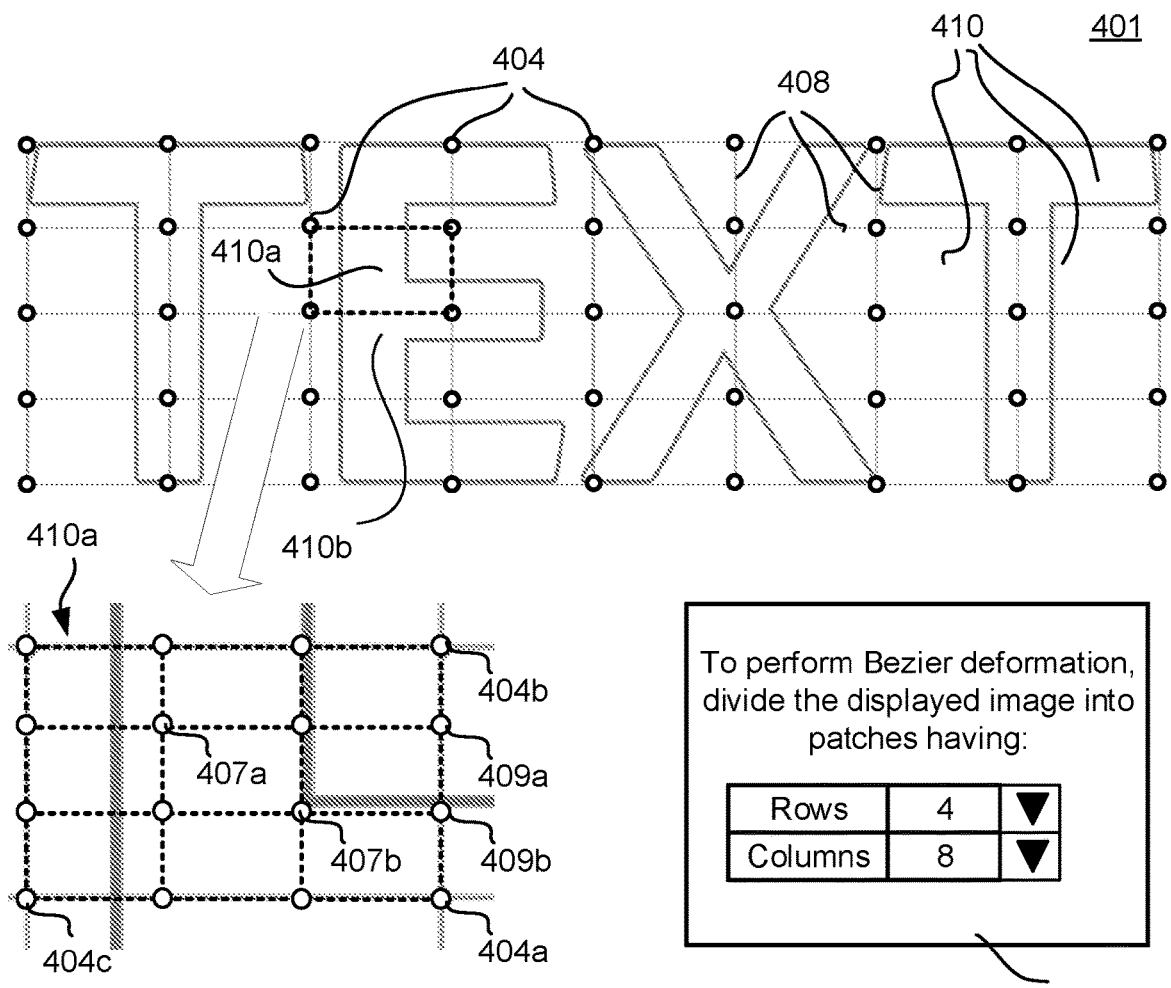

At 308, the image is segmented into a number of non-overlapping segments or Bezier patches 410, e.g., by the image deformation module 112 of the image editing system 102. For example, the image editing system 102 generates multiple Bezier patches of the image 400, and then partitions or segments the image 400 to be deformed into portions corresponding to the Bezier patches. For example, the image 400 is partitioned along edges of the Bezier patches to generate the image 401 of FIG. 4B. Thus, the image 401 is partitioned into a plurality of portions corresponding to a "quilt" including a plurality of parametric patches (e.g., Bezier patches or other spline-based surfaces) in adjacent portions of the image 401. As used herein, the terms "quilt," "Bezier quilt," and "parametric quilt" refer to a region (e.g., a grid) that includes a plurality of parametric patches, such as Bezier patches. For instance, a quilt can include a plurality of Bezier patches covering a region of digital image. As an example, a quilt can include, a 4×8 grid of Bezier patches of the same or different sizes for deforming a digital image, as illustrated in FIG. 4B. For example, in an image that has not been deformed yet, the lines dividing the deformation area into the Bezier patches are straight. For example, two horizontally adjacent patches (or two patches in the same row) cannot have different heights, but the height of individual rows of patches may be different (e.g., patches of a first row can have a first height that is different from a second height of patches of a second row).

In an example, the number of Bezier patches 410 in which the image 400 is divided is user configurable, based on settings pre-selected by the user, and/or based on a default setting. For example, FIG. 4B further illustrates an example User Interface 411 allowing a user to select a number of rows and columns of patches the deformation space is divided into, to perform Bezier deformation of the image, in accordance with some embodiments. The actual text used in the UI 411 (i.e., "To perform Bezier deformation, divide the displayed image into patches having . . . " is merely an example and not limiting. As seen in this example use case, the user selected four rows and eight columns. As a result, FIG. 4B illustrates the image divided or segmented in 4×8 number of patches 410. The image 401 includes 4 rows of patches and 8 columns of patches 410, i.e., a total of 32 patches 410. An example patch 410a of the image 401 is specifically labelled in FIG. 4B, where the boundary of the Bezier patch 410a is illustrated using dotted lines. The terms "patch" and "Bezier patch" are used interchangeably herein.

In the un-deformed image 401 that is rectangular or square, the patches 410 are rectangular or square, and can be of same shape and size. Lines 408 form boundary of individual patches, and points 404 form corners or vertices of individual patch. The points 404 are referred to as "anchor points." As will be discussed herein in turn, in various embodiments, the image 401 can be deformed based on selection of two or more anchor points 401. Referring again to FIG. 3A, at 312 of the method 300a, boundaries (e.g., boundaries 408) of the patches (e.g., patches 410) and the anchor points (e.g., anchor points 404) associated with the patches are displayed along with the image, as seen in FIG. 4B.

In an example and as previously mentioned, each patch 410 in the image 401 is a Bezier patch. A shape of a Bezier patch is controlled by multiple control points. The generated Bezier patches can have any appropriate order, e.g., linear, cubic, bicubic. For example, the image editing system 102 generates a plurality of bicubic Bezier patches 420 to generate a Bezier "quilt". To illustrate, a plurality of bicubic Bezier patches provides a set of 4×4 control points for each of the Bezier patches, such that each Bezier patch includes 16 control points (with at least some control points in a Bezier patch being coincident with control points of adjacent Bezier patches). The control points allow a user to modify the Bezier patches, which causes the image editing system 102 to deform the corresponding image portions (although in various embodiments, only corner control points, i.e., anchor points, are user-manipulated, and other control points are moved automatically). As used herein, the term "control point" refers to a point on a Bezier patch that determines a shape of the Bezier patch. The control points include edge points, corner points, and intermediate points within a Bezier patch. Modifying the position of a single control point can change a shape of a corresponding Bezier patch. Moreover, in an image editing process (e.g., deformation process), the image editing system 102 uses the position of control points of a patch to determine how to modify a corresponding image or image portion.

As an example, FIG. 4B also illustrates a magnified view of the patch 410a. A plurality of control points 407, 409, 404 of the patch 410a are illustrated. For example, control points 404 are corner control points, i.e., are on corners or vertices of the patch 410, and form the anchor points. Control points 409 are edge control points that, along with the corner points, define the edges or boundaries of the patch 410a (the edge control points are on edge or boundary of the patch 410a). Control points 407 are intermediate control points inside the patch 410a. Thus, the anchor points 404 are the corner control points on corners or vertices of individual patches. In a bicubic Bezier patch, there are 16 control points that includes four corner control points, eight edge control points, and four intermediate control points.

An anchor point 404 can be shared by more than one adjoining patch. For example, an anchor point at a corner of the image 401 is not shared by multiple patches, an anchor point at a boundary of the image 401 is shared by two associated patches, and an anchor point that is inside the image 401 is shared by four associated patches. Similarly, edge control points (e.g., which are not on an edge of the image) may be shared by two patches. Thus, some of the anchor points and edge control points are "coincident control points." Furthermore, as used herein, a coincident control point refers to a control point that is shared by two or more adjacent patches. Changing a position of a coincident control point thus modifies more than one patch. Bezier patches and control points are discussed in further details in co-pending U.S. patent application Ser. No. 16/141,276, entitled "GENERATING ENHANCED DIGITAL CONTENT USING PIECEWISE PARAMETRIC PATCH DEFORMATIONS," which is incorporated by reference herein in its entirety.

In some embodiments, the patches 410 are bicubic Bezier patches. In some other embodiments, the patches 410 can be of an order other than bicubic, such as linear or cubic. The term "bicubic" implies that a patch is defined with cubic splines both horizontally and vertically. A patch does not need to have the same polynomial degree in both directions—for example a patch may be cubic across the horizontal direction (i.e., four columns of control points) and quadratic in the vertical direction (i.e., three rows of control points).

For example, when deforming text converted to vector artwork along a curve path, the image editing system 102 uses cubic Bezier patches along the curve and linear perpendicular to it. Utilizing lower order Bezier patches uses less computing resources than higher order Bezier patches. Because the image editing system 102 generates a plurality of Bezier patches (each with its own set of anchor points), the image editing system 102 provides flexibility and accuracy in deformation operations by deforming each image portion individually. In an example, the image editing system 102 can set an order of the Bezier patches (e.g., cubic, quadratic, linear, etc.) based on the digital content (e.g., linear along a height of the text and cubic along the length of the text), or based on a setting associated with a request to deform an image.

Changing a position of a control point (e.g., dragging a control point) causes an image editing system to calculate a deformation for a Bezier patch based on the amount of change of the position of the control point. Thus, it is possible to deform the image 401 by selecting a first control point, moving the first control point, deforming the image 401, selecting a second control point, moving the second control point, further deforming the image 401, and repeating this process iteratively until a desired deformation of the image is achieved. However, doing so requires moving control points one at a time, for multiple times, which may be time consuming and may result in inferior user experience. In contrast, as will be discussed in detail in turn, various embodiments of this disclosure are associated with selecting two or more anchor points, and deforming the image 401 by manipulating the selected anchor points at the same time. Thus, instead of individually moving control points to deform the image 401, in some embodiments, multiple anchor points (e.g., which are essentially corner control points, as previously discussed) are selected, and the multiple selected anchor points moved together (e.g., at the same time) to deform the image 401. Such deformation can result in fewer operations by a user to achieve the desired deformation (e.g., compared to moving the control points one at a time) and can result in better user experience.

Referring again to FIG. 3A, the method 300a comprises, at 316, receiving a selection of two or more anchor points. The selected two or more anchor points can be contiguous or non-contiguous anchor points in the image 401, as explained below. For example, FIG. 4C illustrates a dotted boundary 420, and contiguous anchor points within the boundary 420 are selected.

The selection of the contiguous anchor points is performed by a user using any appropriate input device. In an example, in a touch sensitive display that acts as an input device and/or in a trackpad that acts as an input device, the user selects the contiguous anchor points by a press, hold and drag input. In another example, the user replicates the press, hold and drag input with a mouse, e.g., by clicking, holding and dragging the mouse to select the contiguous anchor points (e.g., the boundary 420 corresponds to an area selected by the user using the click, hold and drag input, and anchor points within the area are selected). In yet another example, the user holds a specific key in the keyboard (e.g., a modifier key, such as the "Shift" key) and drag (e.g., on the touch sensitive display, the trackpad, or the mouse) to select the contiguous anchor points.

In yet another example, the user can click, tap or press on individual anchor points (e.g., while a specific modifier key, such as the Shift key, is pressed) to select multiple anchor points. This way, the user selects contiguous and/or non-contiguous anchor points. While FIG. 4C illustrates selection of contiguous anchor points, selection of non-contiguous anchor points will be discussed in turn (e.g., with respect to FIG. 5A later).

This disclosure is not limited by a manner in which the anchor points are selected, and the selection process is implementation specific.

In an example, the selected anchor points are highlighted in FIG. 4C. For example, in FIG. 4C, while the unselected anchor points are illustrated using small circles with white interior, the selected anchor points are illustrated using small circles with colored, such as black, interior.

The selected anchor points define an area, such as the area covered by a bounding box illustrate by the dotted line 420. In an example, the bounding box 420 is also displayed by the image editing system 102. The bounding box 420 can be shown with dotted lines or colored lines, along with the image 401 and the selected anchor points. For example, referring to FIG. 3A, at 320 of the method 300a, the image editing system 102 causes display of a bounding box (e.g., bounding box 420 of FIG. 4C) illustrating an area covered by the selected two or more anchor points. The visual indication of the bounding box provides the user with an indication of an area within the image that is to be deformed.

The method 300a further comprises, at 324, changing a shape of a cursor (e.g., by the image editing system 102), based on a position of the cursor relative to the bounding box 420. In an example, the position or location of the cursor (which dictates the shape of the cursor) provides an indication of a corresponding deformation type that is to be performed. Table I below lists example cursor locations, corresponding deformation types, and example labels of the cursors in FIG. 4D1. Note that FIG. 4D1 illustrates a magnified view of the image 401, where sections of the images within and immediate vicinity of the bounding box 420 is illustrated. FIG. 4D2 illustrates another example image, an example bounding box 420', example types of deformation and corresponding cursor locations (e.g., discussed with respect to Table I), in accordance with some embodiments of the present disclosure. It is to be noted that the example image illustrated in FIG. 4D2 has already undergone some deformation.

TABLE I

| Row number | Cursor location | Deformation type | Cursor label in FIGS. 4D1 and 4D2 |
|---|---|---|---|
| 1 | Inside the bounding box 420 | Translate or move | 425a |
| 2 | Corner of the bounding box 420 | Uniform scale | 425d |
| 3 | Center of edge or boundary of the bounding box 420 | Non-uniform scale in one direction | 425c |
| 4 | Outside of corner of the bounding box 420 | Rotation | 425b |

As seen in FIG. 4D1, the cursor shape changes with the location of the cursor. For example, as illustrated in FIG. 4D1, when a cursor 424 is relatively far from the bounding box 420, the image editing system 102 illustrates the cursor 424 using a simply arrow or using a default shape of the cursor. However, when the cursor 424 moves or hovers above or near the bounding box 420, the shape of the cursor changes.

When the cursor 424 is at or near a boundary or edge (but not near or at a corner) of the bounding box 420 (e.g., when the cursor is at a center of the edge or boundary), a shape of the cursor is changed (e.g., cursor 425c) to indicate a non-uniform scaling of the portion of the image 401 (e.g., scaling of the image in only one direction) within the bounding box 420. When the cursor 424 is inside the bounding box 420, the shape of the cursor is changed (e.g., cursor 425a) to indicate a translation or linear movement of the portion of the image 401 within the bounding box 420. When the cursor 424 is at or near a corner of the bounding box 420, a shape of the cursor is changed (e.g., cursor 425d) to indicate a uniform scaling of the portion of the image 401 within the bounding box. When the cursor 424 is outside a corner of the bounding box 420, a shape of the cursor is changed (e.g., cursor 425b) to indicate rotation of the portion of the image 401 within the bounding box.

It is to the noted that the mappings depicted in Table I are merely examples and not limiting, and in other embodiments, different deformation types can be associated with different cursor locations.

Referring again to FIG. 3A, at 332, a user input is detected to deform the image, a deformation type is selected based on a location of the cursor during an initiation of the user input, and the image is deformed based on the selected deformation type. Details of operations at 332 are discussed later with respect to FIG. 3B. In an example, the user input is a press, hold and drag input. For example, in a mouse-based input component, the press, hold and drag input is a mouse-based click, hold, and drag input. In another example, the user input is a touchscreen-based or track pad-based press, hold, and drag input. In an example, the user input is to deform the image 401, e.g., deform sections of the image 401 within and adjacent to the bounding box 420. The deformation type used is based on a location of the cursor during an initiation of the user input, as discussed with respect to Table 1. For example, if the user input is initiated while the cursor 424 is within the bonding box 420, the selected deformation type is translate or move, as seen in Table I. If the user input is initiated while the cursor 424 is at or near a corner of the bounding box 420, the selected deformation type is uniform scaling, as seen in Table I, and so on. Subsequently, the image 401 (e.g., sections of the image 401 within and adjacent to the bounding box 420) is deformed. While the location of the cursor 424 at the initiation of the user input dictates a type of deformation to be performed, an extent of the deformation to be performed is based on how far the cursor 24 is moved while the press, hold and drag input is being provided, a speed with which the "drag" component of the input is being performed, etc.

Figure 3B:
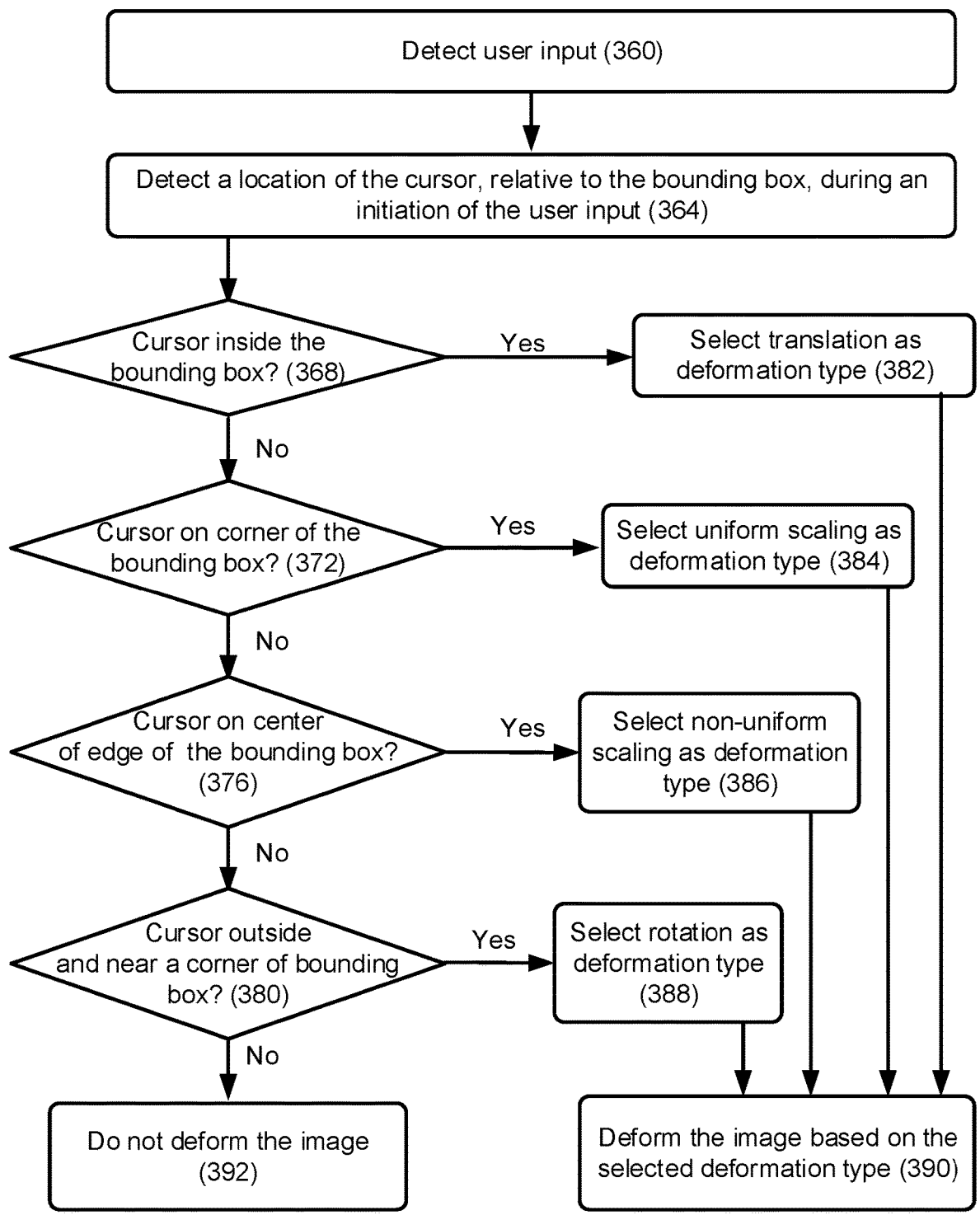
FIG. 3B is a flowchart illustrating an example method for selecting a deformation type based on a user input, and deforming an image based on the selected deformation type, in accordance with some embodiments.

FIG. 3B is a flowchart illustrating example method 332 for selecting a deformation type based on a user input, and deforming an image based on the selected deformation type, in accordance with some embodiments. Method 332 of FIG. 3B explains the operations at 332 of the method 300a of FIG. 3A in further details.

The method 332 includes, at 360, detecting (e.g., by the image deformation module 112 of the image editing system 102) a user input. The user input can be to deform the image. As discussed with respect to the method 300a of FIG. 3A, in an example, the user input is a press, hold and drag input. For example, in a mouse-based input component, the press, hold and drag input is a mouse-based click, hold, and drag input. In another example, the user input is a touchscreen-based or track pad-based press, hold, and drag input. In an example, the user input is to deform the image 401, e.g., deform sections of the image 401 within and adjacent to the bounding box 420.

At 364, a location of the cursor, during an initiation of the user input, is detected, e.g., as discussed with respect to Table I. At 368, the image deformation module 112 of the image editing system 102 determines if the cursor was inside the bounding box, when the user input was initiated. If "Yes" at 368, the method proceeds to 382, where translation is selected as a deformation type, which corresponds to the first row of Table I.

If "No" at 368, the method 332 proceeds to 372, where the image deformation module 112 of the image editing system 102 determines if the cursor was on a corner of the bounding box, when the user input was initiated. If "Yes" at 372, the method proceeds to 384, where uniform scaling is selected as a deformation type, which corresponds to the second row of Table I.

If "No" at 372, the method 332 proceeds to 376, where the image deformation module 112 of the image editing system 102 determines if the cursor was on a center of an edge or boundary of the bounding box, when the user input was initiated. If "Yes" at 376, the method proceeds to 386, where non-uniform scaling is selected as a deformation type, which corresponds to the third row of Table I.

If "No" at 376, the method 332 proceeds to 380, where the image deformation module 112 of the image editing system 102 determines if the cursor was outside the bounding box but near a corner (e.g., near a selected anchor point) of the bounding box, when the user input was initiated. If "Yes" at 380, the method proceeds to 388, where rotation is selected as a deformation type, which corresponds to the fourth row of Table I.

If "No" at 380, this implies that the user input was initiated outside and relatively far away from the bounding box, which further implies that no deformation is to be made. Accordingly, the method 332 proceeds to 392, where it is determined that the image is not to be deformed.

Subsequent to any of 382, 384, 386, or 388 (where an appropriate deformation type is selected), the method 332 proceeds to 390, where the image is deformed, based on the selected deformation type. Deformation of the image, based on the selected deformation type, will be discussed in further detail herein in turn.

Referring again to FIG. 3A, at 336, the image editing system 102 determines if an end of image deformation is reached. For example, after performing one or more deformations of the image 401, the user may close an application for image deformation, thereby indicating an end of the deformation. In another example, the user may close the deformed image to indicate an end of deformation. In yet another example, the user may initiate another deformation to indicate that the deformation is not yet complete. Thus, if the user chooses to undergo another cycle of deformation, and the method 300a loops back to 332. Although not illustrated in FIG. 3A, the user may also select another set of anchor points, in which case the method 300a loops back to 320. If an end of deformation is indicated, at 340, the image editing system 102 causes display of the deformed image and/or provides an option to save the deformed image, and the method 300a ends.

Figure 4E:
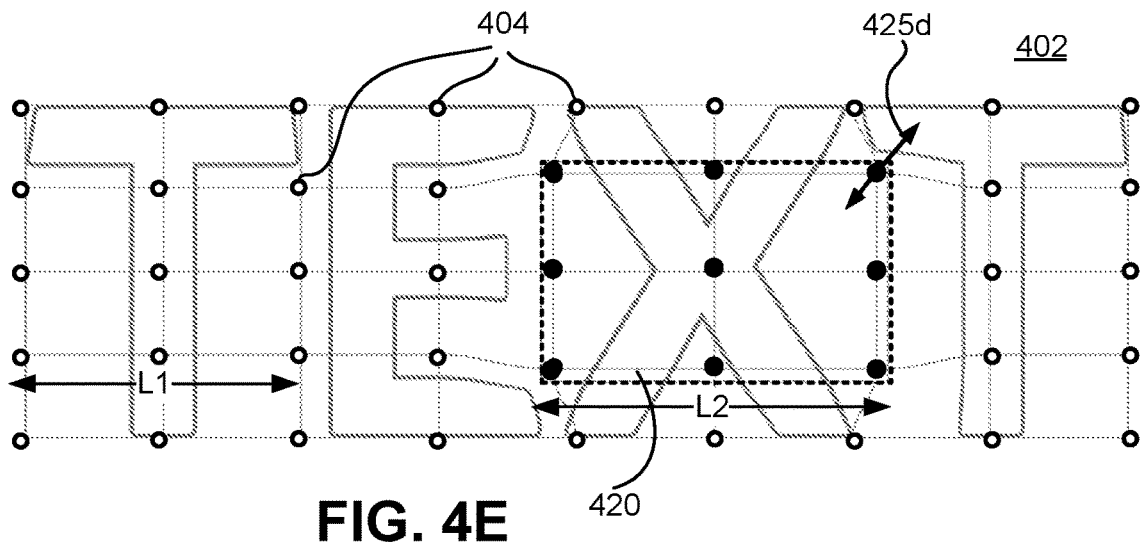

FIG. 4E illustrates a uniform scaling operation on the image 401 of FIGS. 4C-4D1 to generate an image 402, which corresponds to the selection at 384 of the method 332 of FIG. 3B. For example, the uniform scaling operation is a uniform enlargement operation, where the section of the image within the bounding box is enlarged in both X and Y directions uniformly. For example, in FIGS. 4C-4D1 a width of the bounding box 420 is L1. Thus, in FIGS. 4C-4D1, where the anchor points are evenly spaced apart (e.g., as the image 401 has not undergone through any deformation yet), L1 represents a width between two anchor points in the same horizontal line and with a third anchor point in between, as illustrated in FIG. 4C. In FIG. 4E where the image 401 has undergone the uniform scaling operation, the width of the bounding box 420 is L2, where L2 is larger than L1. Thus, the section within the bounding box 420 of image 402 occupies more space relative to other sections of the image 402. It may be noted that although the uniform scaling operation discussed with respect to FIG. 4E increases the size of the bounding box 420, the uniform scaling operation can decrease the size as well, in which case L2 will be smaller than L1.

The uniform scaling operation is based on an initial position of the cursor inside the bonding box 420, when the user input to deform the image is received. The extent of the scaling is based on the extent of the "drag" component of user input.

The uniform scaling operation of FIG. 4E not only deforms (e.g., uniformly scales) the section of the image within the bounding box 420, but also deforms sections of the image adjacent to the bounding box 420 as well. For example, the top horizontal line of the letter "E" in the image is deformed, e.g., to provide space for the uniform enlargement of the section of image within the bounding box 420.

The uniform scaling operation of FIG. 4E is a type of Bezier deformation, where parametric continuity, connectivity and collinearity of the image is maintained across the boundary of the bounding box 420, even after the deformation. Thus, the deformation is a type of affine transformation. For example, affine transformation preserves collinearity (e.g., all points lying on a line initially still lie on a line after transformation) and/or ratios of distances (e.g., the midpoint of a line segment remains the midpoint after transformation). This is somewhat evident in FIG. 4E, and will be discussed in further detail in turn.

Figure 4F:
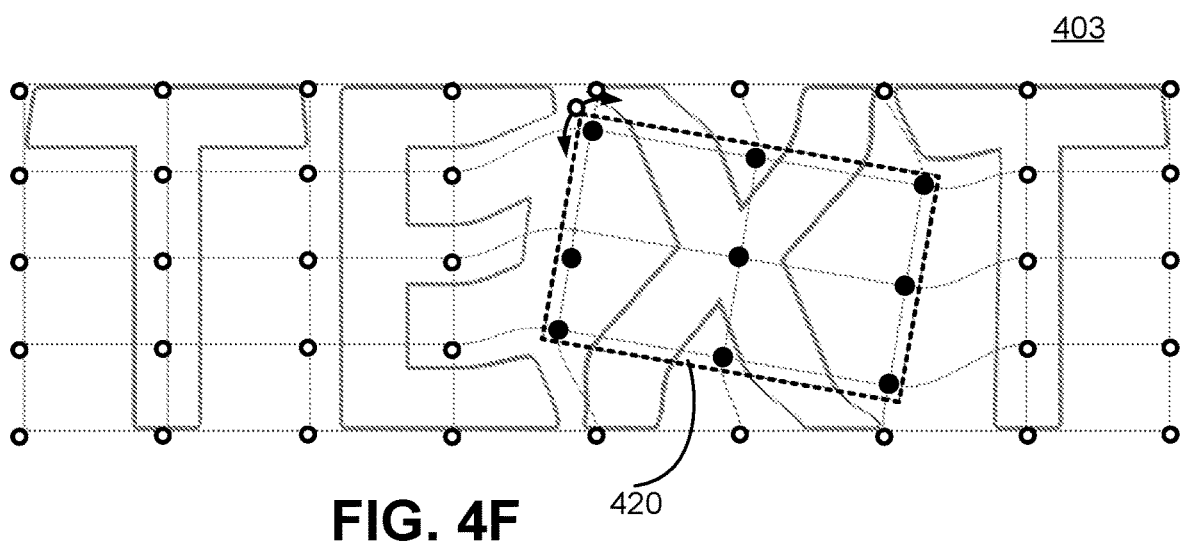

FIG. 4F illustrates a rotation operation on the image 402 of FIG. 4E to generate an image 403 of FIG. 4F, which corresponds to the selection at 388 of the method 332 of FIG. 3B. For example, the rotation operation rotates the section of the image within the bounding box 420. The rotation operation is based on an initial position of the cursor near a corner of the bonding box 420, when the user input to deform the image is received. The direction and degrees of rotation are based on the direction and extent of the "drag" component of user input.

The rotation operation of FIG. 4F not only deforms (e.g., rotates) the section of the image within the bounding box 420, but also deforms sections of the image adjacent to the bounding box 420 as well. For example, the top and bottom sections of the letter "X" and the horizontal lines of the letter "E" outside the bounding box 420 are also deformed. Such deformation of the sections of the image 403 adjacent to, but outside, the bounding box 420 is to preserve continuity, connectivity, collinearity and/or ratios of distances of the image on the edge of the bounding box 420, as is the case with Bezier deformation and affine transformation. For example, the rotational deformation preserves collinearity, connectivity, continuity and/or ratios of distances across the edge of the boundary box 420. Thus, even after rotation, there is no discontinuity or non-collinearity in the lines of the letter "X" at the boundary of the bounding box 420.

Figure 4G:
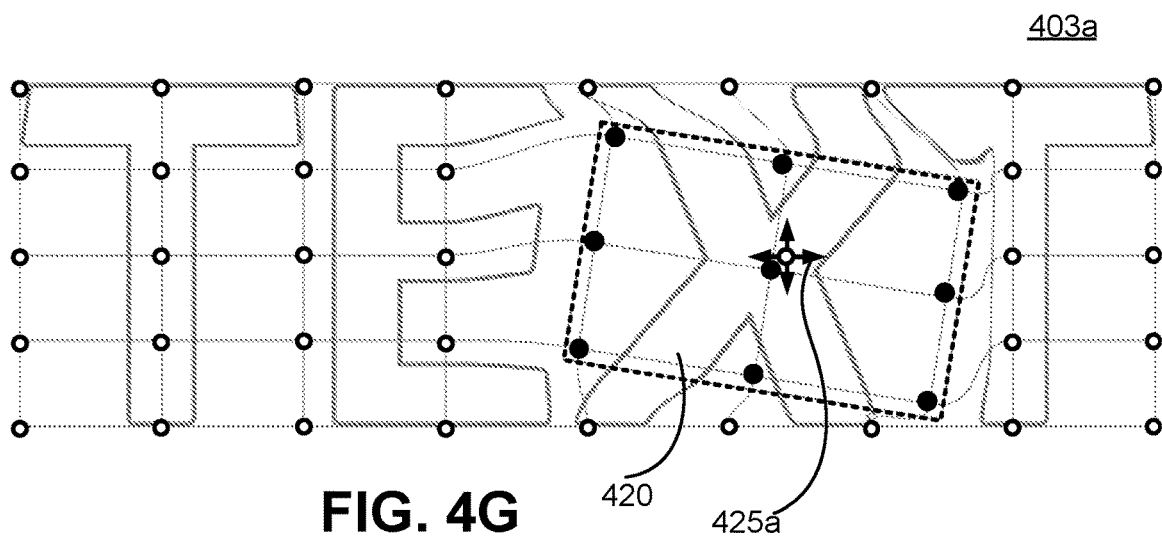

FIG. 4G illustrates a movement or translation operation on the image 403 of FIG. 4F to generate an image 403*a* of FIG. 4G, which corresponds to the selection at 382 of the method 332 of FIG. 3B. For example, the translation operation translates or moves the section of the image within the bounding box 420. This operation is based on an initial position of the cursor inside the bonding box 420, when the user input to deform the image (e.g., the press, hold and drag input) is received. The direction and extent of the movement are based on the direction and extent of the "drag" component of user input.

The operation of FIG. 4G not only deforms (e.g., moves) the section of the image within the bounding box 420, but also deforms sections of images adjacent to the bounding box 420, as illustrated and as also discussed with respect to FIGS. 4E, 4F. Such deformation of the sections of the image 403*a* adjacent to the bounding box 420 is to preserve continuity, collinearity and/or ratios of distances of the image on the edge of the bounding box, as is the case with Bezier deformation and affine transformation.

In an example, prior to deformation of an image, the patches are rectangular or square, and can be of same shape and size. However, after the deformation, one or more patches can have non-rectangular or non-square in shape, as illustrated in FIGS. 4E-4G. For example, patches neighboring to and outside the bounding box can have non-rectangular or non-square shape after deformation. As seen in FIGS. 4E-4G, one or more patches within the bounding box retain their rectangular or square.

As previously discussed herein, a Bezier patch comprises multiple control points. For example, a bicubic Bezier patch includes 4×4, i.e., 16 control points. The control points include edge points, corner points (e.g., which are the anchor points), and intermediate points within a Bezier patch, as previously discussed. Deforming image within a bounding box defined by multiple anchor points involves moving and/or rotating the underlying control points, e.g., at the same time or together. However, changes in position of the control points are transparent to the user—the user may not even be provided with any visual indication of the control points in FIGS. 4A-4G. In an example, changes in position of the control points cause the associated deformation of the Bezier patches.

For example, dragging within the bounding box (e.g., as discussed with respect to the first row of Table I) moves the control points that are within the bounding box, such as in FIG. 4G. Dragging a corner of the bounding box (e.g., as discussed with respect to the second row of Table I) scales the control points within the bounding box symmetrically or uniformly, such as in FIG. 4E. Dragging the center of an edge (e.g., as discussed with respect to the third row of Table I) scales the control points within the bounding box asymmetrically, e.g., in one specific direction. Dragging immediate outside a corner of the bounding box (e.g., as discussed with respect to the fourth row of Table I) rotates the control points within the bounding box. In an example, control points outside but nearby the bounding box are also transformed, e.g., to preserve continuity and/or collinearity of the image, as is done with Bezier deformation. For example, when an anchor point is moved, immediate adjacent control points are also moved, e.g., as discussed herein later with respect to FIG. 8.

To perform the actions associated with transforming the control points, a transform object, such as the bounding box, is generated, in response to the selection of the anchor points. In an example, the image editing system 102 initializes the values for translation (e.g., x and y coordinates) to zero, scale (e.g., length of the bounding box in x and y directions) to one, and the rotation angle to zero. The values for translation, scale and/or the rotation angle are changed, in response to the deformation type selected by the user and in response to an extent of deformation performed by the user.

The initialization process also saves the current location of the selected anchor points, control points that are within the bounding box, and as well as control points immediate adjacent to the anchor points that are to be moved (e.g., discussed with respect to FIG. 8 later). This preserves continuity across the patches, and provides a smooth transition between the portions that are manipulated or deformed, and those that are not. In an example, points shared along the edges of individual patches are each treated as a single point during the deformation.

Thus, the various deformation operations discussed herein involves changing positions of control points. For example, as the user moves the cursor and deforms the image, the change in position of the cursor is used to update the transform values of the control points (e.g., translate, scale, rotate, etc.) based on the selected deformation type. This transform is applied to the saved original copies of the selected anchor points and the control points adjacent to those anchor points, and the image warp is run with the new positions of the control points. When the deformation operation is completed, the warp of the image is updated with the transformed anchor and control point values, and the original ones are optionally discarded.

In FIGS. 4A-4G, the selected anchor points 404 define a rectangle. However, the selected anchor points can define any other appropriate shape, such as a square, a trapezoid, a pentagon, a hexagon, a line (e.g., if the selected two or more points are collinear), etc. FIGS. 5A-5D illustrate deformation of an image where the selected anchor points 504 are collinear, in accordance with some embodiments.

Figure 5A:
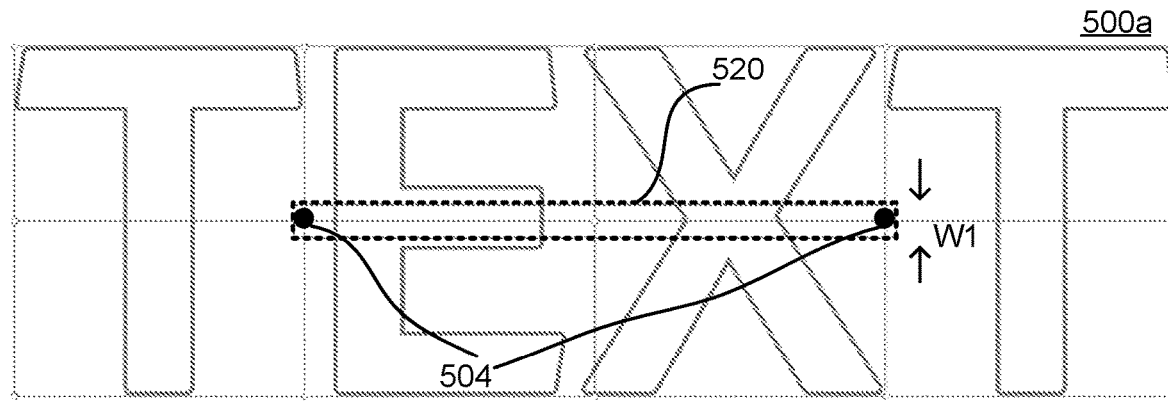
FIGS. 5A-5D illustrate deformation of an image where selected anchor points are collinear, in accordance with some embodiments of the present disclosure.

Referring to FIG. 5A, illustrates is an original image 500*a*, with two anchor points 504 selected. The selected anchor points are collinear and hence, in an example, an area inside a bounding box 520 around the selected anchor points 504 is a line. In another example, even if colinear anchor points are selected, the resulting bounding box 520 has a relatively low width, illustrated as W1 in FIG. 5A. Thus, the bounding box 520 still covers a two-dimensional area. The width W1 can be sufficiently long to allow the user to, for example, interact with one or more edges of the bounding box 520, with any of the four corners of the bounding box 520, or with inside of the bounding box 520. That is, the width W1 ensures that the edges, corners, or inside of the bounding box 520 can be individually selected (e.g., which is not possible if the bounding box 520 is just a line).

In an example, the two selected anchor points 504 have a third anchor point in between, where the third anchor point is not selected. Thus, the selected anchor points 504 are non-contiguous, with one or more non-selected anchor points between the selected anchor points. For example (discussed previously with respect to 316 of the method 300*a*) the user clicks or presses on individual anchor points (e.g., while a modifier key, such as the Shift key, is pressed) to select multiple anchor points. This way, the user selects contiguous and/or non-contiguous anchor points, such as the non-contiguous anchor points 504.

Figure 5B:
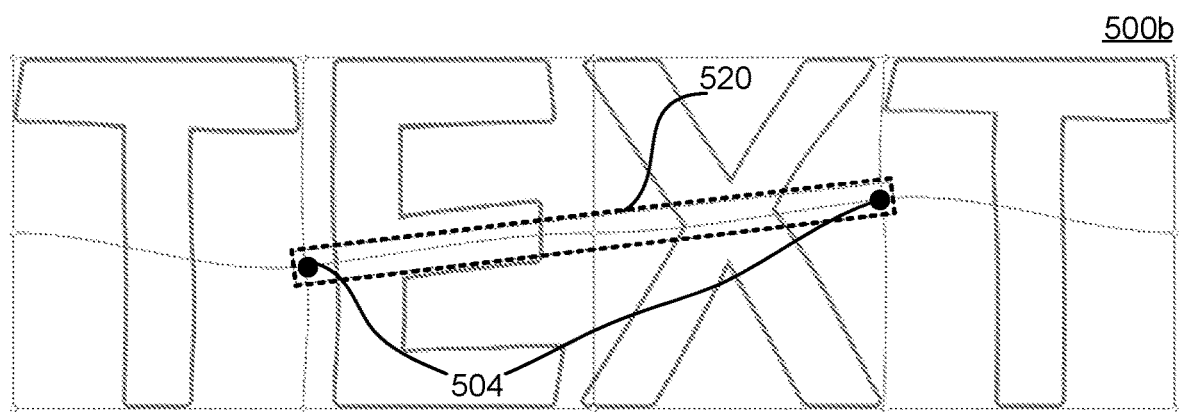
Figure 5C:
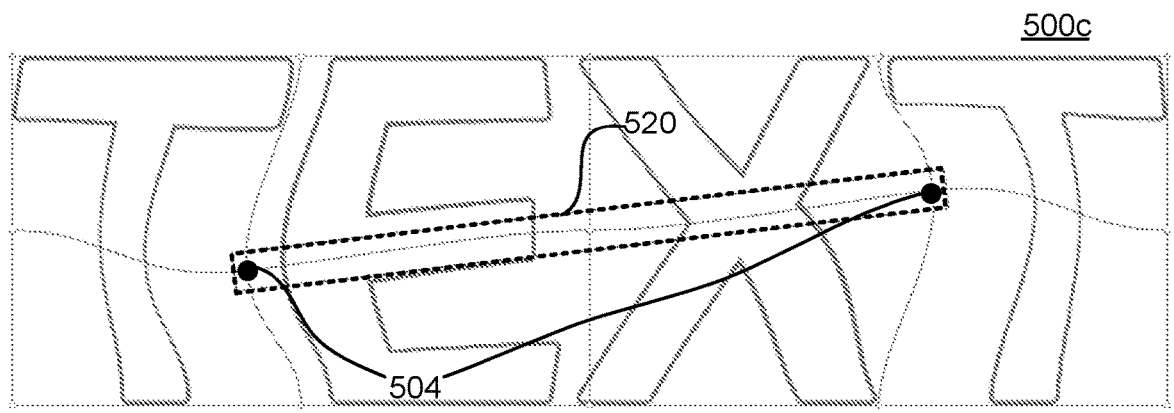
Figure 5D:
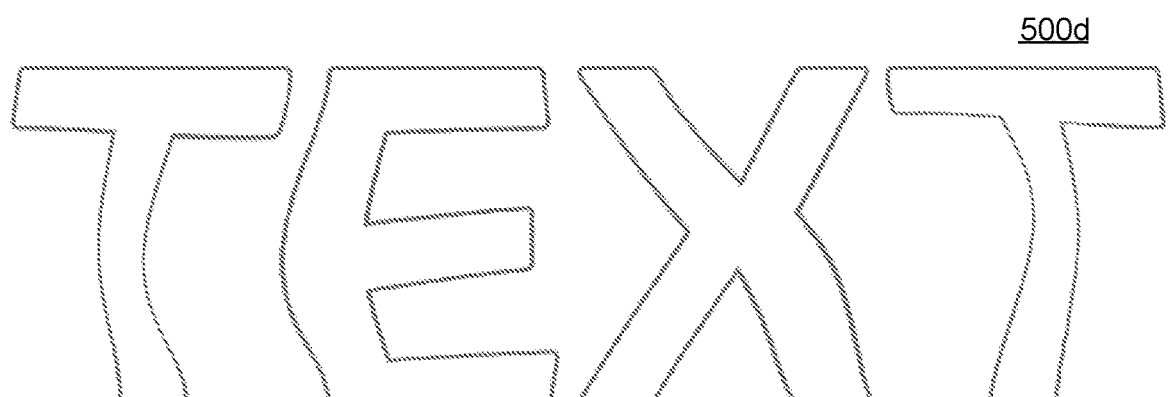

FIG. 5B illustrates a rotation operation of the section of the image within the bounding box 520 to generate an image 500*b*. FIG. 5C illustrates a non-uniform scaling operation (e.g., enlargement in a specific direction) of the section of the image within the bounding box 520 to generate an image 500c. FIG. 5D illustrates an image 500d, that is same as the image 500c of FIG. 5C, but without the bounding box 520, the anchor points and the boundary of individual patches.

As illustrated in each of FIGS. 5B and 5C, each deformation operation not only deforms the section of the image within the bounding box 520, but also deforms sections of the image adjacent to and outside the bounding box 520. Such deformation of the sections of the image outside but adjacent to the bounding box 520 is for preserving continuity, collinearity and/or ratios of distances of the image on the edges of the bounding box 520, as is the case with Bezier deformation and affine transformation. In an example, such deformation of the sections of the image outside but adjacent to the bounding box 520 occurs because the control points surrounding the moved anchor points are also transformed with those anchor points, e.g., as discussed herein later with respect to FIG. 8.

Figure 6:
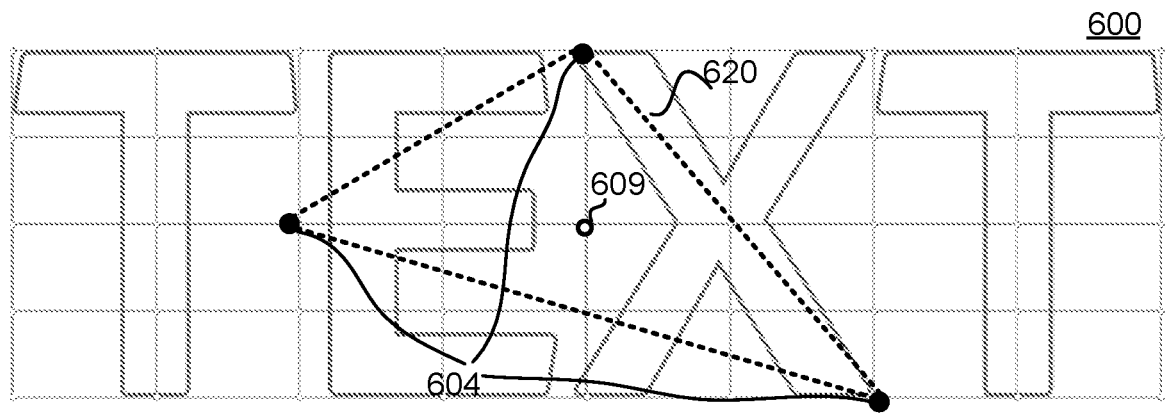
FIG. 6 illustrates selection of non-contiguous anchor points in an image, where the selected anchor points form a triangle, in accordance with some embodiments of the present disclosure.

FIG. 6 illustrates selection of non-contiguous anchor points in an image 600, where the selected anchor points 604 form a triangle, in accordance with some embodiments. As an example, and as discussed previously with respect to 316 of the method 300a, the user can click or press on individual anchor points (e.g., while a modifier key, such as the Shift key, is pressed) to select multiple anchor points. This way, the user selects contiguous and/or non-contiguous anchor points, such as the non-contiguous anchor points 604. The resulting bounding region 620 has a triangular shape. Note that an anchor point 609 within the bounding region 620 is not selected, as the anchor points 604 are individually selected in this example.

In this example, a boundary of the bounding region 620 does not overlap a boundary of various Bezier patches. Deformation of the image 600 can be performed by appropriate user input, as discussed herein previously. For example, while deforming the image 600 (e.g., based on a deformation type that is selected in response to the user input, as discussed with respect to FIG. 3B), control points within the bounding region 620 are rotated or moved, thereby deforming the image 600.

Although the bounding region 620 has a triangular shape, in some example, a rectangular (e.g., and not triangular) bounding box is drawn enclosing the selected points (e.g., although the selected points can form a triangle, or other non-rectangular or non-colinear shape), so that the user controls are consistent. While irregular selection regions may be useful, the resulting controls for manipulation can be displayed as a rectangular box in an example. However, in another example, bounding regions having non-rectangular shape is used, as in FIG. 6.

Figure 7:
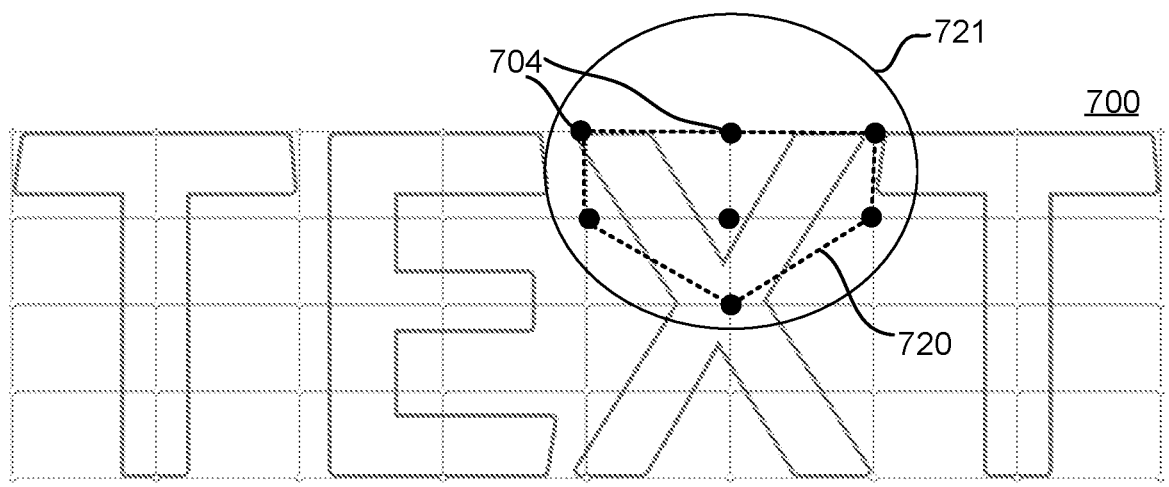
FIG. 7 illustrates selection of anchor points in an image using press, hold and drag input action, where the selected anchor points form a non-rectangular bounding box, in accordance with some embodiments.

FIG. 7 illustrates selection of anchor points in an image 700 using press, hold and drag input action, where the selected anchor points 704 form a non-rectangular bounding box 720, in accordance with some embodiments. For example, the image editing system 102 allows the cursor to form an oval, an ellipse, a triangle, or any other appropriate shape while performing the user action to select the anchor points. In the example of FIG. 7, the user selects the oval shape for selection of anchor points, and performs the press (e.g., pressing, like in a trackpad or a touch-screen, or clicking in a mouse), hold and drag input action by generating an oval shape 721. Anchor points within the oval shape 721 are highlighted and selected.

Figure 8:
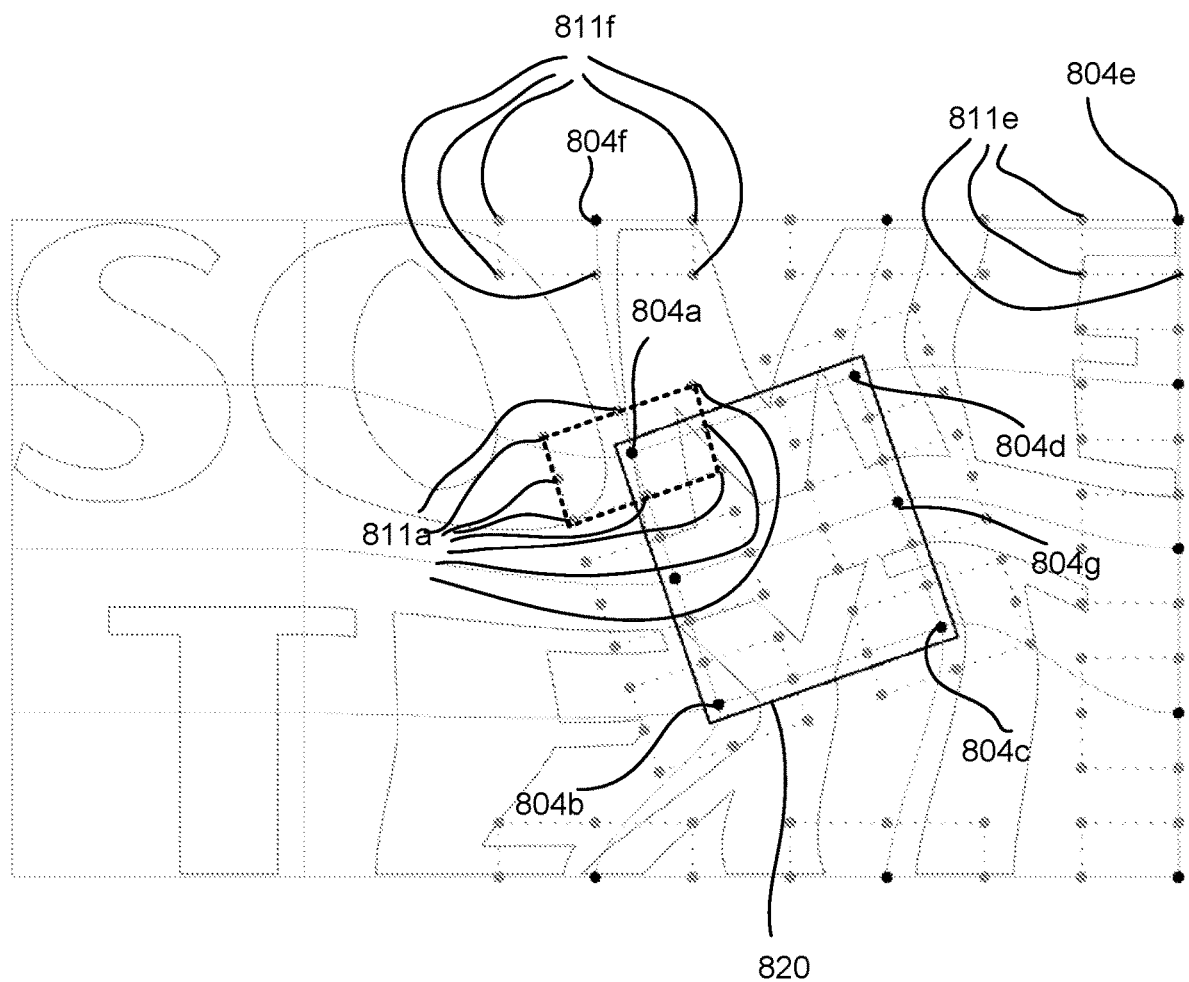
FIG. 8 illustrates an anchor point being surrounded by immediate adjacent control points that are to be moved when moving the anchor point, in accordance with some embodiments.

FIG. 8 illustrates an anchor point being surrounded by immediate adjacent control points that are to be moved when moving the anchor point, in accordance with some embodiments. Illustrated in FIG. 8 is a bounding box 820 in an image 800. Labelled in FIG. 8 are anchor points 804a, 804b, 804c, 804d on four corners of the bounding box 821. Because the bounding box 821 encompasses more than one Bezier patch, other anchor points, such as anchor point 804g are also present on the bounding box 820. Also labelled are anchor point 804f on an edge on the image 800, and anchor point 804e on a corner of the image 800.

Also illustrated are various control points (e.g., control points which are non-anchor control points). For example, each anchor point inside the image 800 (e.g., anchor points that are not on edge or corner of the image) are surrounded by eight adjacent control points. For example, the anchor point 804a is surrounded by eight adjacent control points 811a. A dotted boundary drawn around the anchor point 804a shows the control points 811a immediate adjacent to the anchor point 804a. Similarly, each of the anchor points 804b, 804c, 804d, 804g also has corresponding eight adjacent control points, although such control points are not labelled in FIG. 8.

An anchor point on an edge of the image 800, such as the anchor point 804f, has five adjacent control points, such as control points 811f. An anchor point on a corner of the image 800, such as the anchor point 804e, has three adjacent control points, such as control points 811e.

Whenever an anchor point is moved (e.g., as a part of deforming the image, discussed with respect to FIGS. 3A-5D), adjacent control points also move correspondingly. For example, if the anchor point 804a is moved, then the eight immediate adjacent control points 811a are also moved, e.g., to maintain continuity and collinearity of the image across the boundary of the bounding box 820.

Numerous variations and configurations will be apparent in light of this disclosure and the following examples.

Example 1. A method for deforming an image, the method comprising: dividing the image in a plurality of non-overlapping sections, wherein an individual vertex of an individual section forms a corresponding anchor point, such that the image includes a plurality of anchor points; causing display of the image along with the plurality of anchor points; receiving a selection of two or more anchor points; causing display of a bounding box over the image and that includes the selected two or more anchor points; detecting a user input associated with the bounding box; and deforming, based on the user input, a first portion of the image that is within the bounding box, while preserving continuity of the deformed first portion of the image with one or more second portions of the image that are outside the bounding box.

Example 2. The method of example 1, wherein deforming the first portion of the image comprises: deforming the first portion of the image, while preserving collinearity and connectivity of the deformed first portion of the image with the one or more second portions of the image.

Example 3. The method of any of examples 1-2, wherein: individual sections of the plurality of sections of the image are Bezier patches; and deforming the first portion of the image comprises deforming the first portion of the image using Bezier deformation.

Example 4. The method of any of examples 1-3, wherein deforming the first portion of the image comprises performing an affine transformation on the first portion of the image.

Example 5. The method of any of examples 1-4, further comprising: selecting a deformation type from a plurality of deformation types, based on a location of initiation of the user input relative to the bounding box, wherein deforming the first portion of the image is based on the selected deformation type.

Example 6. The method of example 5, wherein the plurality of deformation types includes uniform scaling of the first portion, non-uniform scaling of the first portion in one direction, rotation of the first portion, and translation of the first portion.

Example 7. The method of example 5, wherein selecting the deformation type further comprises: selecting rotation as the deformation type, based on the location being outside the bounding box and adjacent to one of the selected anchor points.

Example 8. The method of example 5, wherein selecting the deformation type further comprises: selecting translation as the deformation type, based on the location being inside the bounding box.

Example 9. The method of example 5, wherein selecting the deformation type further comprises: selecting uniform scaling as the deformation type, based on the location being on or near one of the selected anchor points.

Example 10. The method of example 5, wherein selecting the deformation type further comprises: selecting non-uniform scaling as the deformation type, based on the location being an edge of the bounding box.

Example 11. The method of any of examples 1-10, wherein the user input is one of (1) a press-hold-and-drag input via an input device or (2) a click or tap input via an input device.

Example 12. The method of example 11, wherein the press-hold-and-drag input and/or the click or tap input is a mouse-based input.

Example 13. The method of example 11, wherein the press-hold-and-drag input and/or the click or tap input is a touchscreen-based input.

Example 14. The method of example 11, wherein the press-hold-and-drag input and/or the click or tap input is a trackpad-based input.

Example 15. The method of any of examples 1-14, wherein individual sections of the plurality of sections of the image are cubic or bicubic Bezier patches.

Example 16. The method of any of examples 1-15, wherein: a target section of the plurality of sections of the image, which is at least in part within the bounding box, is a cubic or bicubic Bezier patch; the target section is associated with a plurality of control points of the Bezier patch, the plurality of control points including (i) a plurality of intermediate control points that are within the target section, (ii) a plurality of corner control points that are on vertices of the target section and that form the anchor points, and (iii) a plurality of edge control points that are on edges of the target section; and deforming the first portion of the image comprises moving one or more of plurality of control points that are on and within the bounding box, based on the user input.

Example 17. The method of any of examples 1-16, wherein dividing the image in the plurality of sections comprises: receiving further user input specifying a number of rows and a number of columns, thereby defining a total number of sections; and dividing the image into the total number of sections.

Example 18. The method of any of examples 1-17, wherein the selected two or more anchor points comprise contiguous anchor points, such that no non-selected anchor point is between two selected anchor points in the image.

Example 19. The method of any of examples 1-17, wherein the selected two or more anchor points comprise non-contiguous anchor points, such that a non-selected anchor point is between two selected anchor points in the image.

Example 20. The method of any of examples 1-19, wherein receiving the selection of two or more anchor points comprises: receiving a drag input to select the two or more anchor points.

Example 21. The method of any of examples 1-20, wherein receiving the selection of two or more anchor points comprises: receiving user input that indicates a selection of individual anchor points, to select the two or more anchor points.

Example 22. A system comprising: one or more processors; and an image editing system executable by the one or more processors to segment an image in a plurality of Bezier patches, each Bezier patch having a plurality of control points, wherein corner control points of individual patches form anchor points, such that the image is associated with a plurality of anchor points, cause to display the image and the anchor points, receive a selection of two or more anchor points, the selected anchor points defining a bounding box within the image, wherein two or more control points are on and/or within the bonding box, and move the two or more control points at the same time, based on a user input to deform the image.

Example 23. The system of example 22, wherein the two or more control points on and/or within the bonding box are first two or more control points, and wherein second two or more control points are outside and adjacent to the bounding box, and wherein the image editing system is to: move the second two or more control points while moving the first two or more control points, such that continuity and collinearity of the image in maintained across a boundary of the bounding box.

Example 24. The system of any of examples 22-23, wherein the image editing system is to move the two or more control points in accordance with affine transformation of a portion of the image within the bounding box.

Example 25. The system of any of examples 22-24, wherein a Bezier patch of the plurality of Bezier patches has 16 control points that includes (i) four corner control points that are on four corners of the Bezier patch and that form the anchor points, (ii) eight edge control points that are four edges of the Bezier patch, and (iii) four intermediate control points that are inside the Bezier patch.

Example 26. The system of any of examples 22-25, wherein the image editing system is to: select a deformation type from a plurality of deformation types, based on a location relative to the bounding box from which a user input is initiated; and move the two or more control points based on the selected deformation type.

Example 27. The system of example 26, wherein the plurality of deformation types includes uniform scaling of the first portion, non-uniform scaling of the first portion in one direction, rotation of the first portion, and translation of the first portion.

Example 28. The system of example 26, wherein the image editing system is to: select rotation as the deformation type, based on the location being outside the bounding box and adjacent to one of the selected anchor points.

Example 29. The system of example 26, wherein the image editing system is to: select translation as the deformation type, based on the location being inside the bounding box.

Example 30. The system of example 26, wherein the image editing system is to: select uniform scaling as the deformation type, based on the location being on or near one of the selected anchor points.

Example 31. The system of example 26, wherein the image editing system is to: select non-uniform scaling as the deformation type, based on the location being an edge of the bounding box.

Example 32. The system of any of examples 22-32, wherein the user input is a click-hold-and-drag input via a mouse.

Example 33. The system of any of examples 22-32, wherein the user input is a press-hold-and-drag input via a touch-screen or a trackpad.

Example 34. A computer program product including one or more non-transitory machine-readable mediums encoded with instructions that when executed by one or more processors cause a process to be carried out for deforming an image, the process comprising: partitioning an image into a plurality of patches; causing display of the image and corner points of individual patches; receiving a selection of two or more corner points; and performing a Bezier transformation of at least a portion of the image, based on the selection of the two or more corner points.

Example 35. The computer program product of example 34, the process comprising:
  causing display of a bounding box that is defined by or otherwise includes the selected two or more corner points; receiving a user input comprising a dragging action; determining a location from where the user input was initiated relative to the bounding box; and performing the Bezier transformation, based on the location from where the user input was initiated relative to the bounding box.

Example 36. The computer program product of example 35, wherein performing the Bezier transformation includes: selecting rotation for the Bezier transformation, based on the location being outside the bounding box and adjacent to one of the selected corner points.

Example 37. The computer program product of example 35, wherein performing the Bezier transformation includes: selecting translation for the Bezier transformation, based on the location being inside the bounding box.

Example 38. The computer program product of example 35, wherein performing the Bezier transformation includes: selecting uniform scaling for the Bezier transformation, based on the location being on one of the selected corner points.

Example 39. The computer program product of example 35, wherein performing the Bezier transformation includes: selecting non-uniform scaling for the Bezier transformation, based on the location being an edge of the bounding box.

Example 40. The computer program product of example 34, the process comprising: causing display of a bounding box that is defined by or otherwise includes the selected two or more corner points, wherein at least the portion of the image on which the Bezier transformation is performed comprises the bounding box.

Example 41. The computer program product of example 40, wherein: each of a first patch within the bounding box and a second patch outside of the bounding box has a rectangular shape, prior to the Bezier transformation; the first patch has the rectangular shape after the Bezier transformation; and the second patch has a non-rectangular shape after the Bezier transformation.

Example 42. The computer program product of any of examples 34-41, wherein: individual patches comprise cubic or bicubic Bezier patches; and the corner points of individual patches comprise corner control points of the cubic or bicubic Bezier patches.

Example 43. The computer program product of any of examples 34-42, wherein: the two or more corner points are contagious corner points.

Example 44. The computer program product of any of examples 34-42, wherein: the two or more corner points are non-contagious corner points.

Example 45. The computer program product of any of examples 34-44, wherein the image is a vector image.

Example 46. The computer program product of any of examples 34-44, wherein the image is a raster image.

Example 47. A server comprising the computer program product of any of examples 34-46.

Example 48. A client-server system comprising the computer program product of any of examples 34-47.

The foregoing detailed description has been presented for illustration. It is not intended to be exhaustive or to limit the disclosure to the precise form described. Many modifications and variations are possible in light of this disclosure. Therefore, it is intended that the scope of this application be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method for deforming an image, the method comprising:
  dividing the image in a plurality of non-overlapping sections, wherein an individual vertex of an individual section forms a corresponding anchor point, such that the image includes a plurality of anchor points;
  causing display of the image along with the plurality of anchor points;
  receiving a selection of two or more anchor points from the displayed plurality of anchor points;
  causing display of a bounding box over the image, based on and in response to the selection of the two or more anchor points, the bounding box including the selected two or more anchor points, wherein the selection of the two or more anchor points is received before the bounding box is displayed;
  detecting a user input associated with the bounding box; and
  based on the user input, causing deformation of a first portion of the image that is within the bounding box, while preserving continuity of the deformed first portion of the image with one or more second portions of the image that are outside the bounding box.

2. The method of claim 1, wherein deforming the first portion of the image comprises:
  deforming the first portion of the image, while preserving collinearity and connectivity of the deformed first portion of the image with the one or more second portions of the image.

3. The method of claim 1, wherein:
  individual sections of the plurality of sections of the image are Bezier patches; and
  deforming the first portion of the image comprises deforming the first portion of the image using Bezier deformation.

4. The method of claim 1, wherein deforming the first portion of the image comprises performing an affine transformation on the first portion of the image.

5. The method of claim 1, further comprising:
   selecting a deformation type from a plurality of deformation types, based on a location of initiation of the user input relative to the bounding box,
   wherein deforming the first portion of the image is based on the selected deformation type.

6. The method of claim 5, wherein the plurality of deformation types includes uniform scaling of the first portion, non-uniform scaling of the first portion in one direction, rotation of the first portion, and translation of the first portion.

7. The method of claim 5, wherein selecting the deformation type further comprises:
   selecting rotation as the deformation type, based on the location being outside the bounding box and adjacent to one of the selected anchor points.

8. The method of claim 5, wherein selecting the deformation type further comprises:
   selecting translation as the deformation type, based on the location being inside the bounding box.

9. The method of claim 5, wherein selecting the deformation type further comprises:
   selecting uniform scaling as the deformation type, based on the location being on or near one of the selected anchor points.

10. The method of claim 5, wherein selecting the deformation type further comprises:
    selecting non-uniform scaling as the deformation type, based on the location being an edge of the bounding box.

11. The method of claim 1, wherein the user input is one of (1) a press-hold-and-drag input via an input device or (2) a click or tap input via an input device.

12. The method of claim 1, wherein:
    a target section of the plurality of sections of the image, which is at least in part within the bounding box, is a cubic or bicubic Bezier patch;
    the target section is associated with a plurality of control points of the Bezier patch, the plurality of control points including (i) a plurality of intermediate control points that are within the target section, (ii) a plurality of corner control points that are on vertices of the target section and that form the anchor points, and (iii) a plurality of edge control points that are on edges of the target section; and
    deforming the first portion of the image comprises moving one or more of plurality of control points that are on and within the bounding box, based on the user input.

13. The method of claim 1, wherein the selected two or more anchor points comprise contiguous anchor points, such that no non-selected anchor point is between two selected anchor points in the image.

14. The method of claim 1, wherein the selected two or more anchor points comprise non-contiguous anchor points, such that a non-selected anchor point is between two selected anchor points in the image.

15. A system comprising:
    one or more processors; and
    an image editing system executable by the one or more processors to
       segment an image in a plurality of Bezier patches, each Bezier patch having a plurality of control points,
       wherein corner control points of individual patches form anchor points, such that the image is associated with a plurality of anchor points,
    cause display of the image and the anchor points,
    receive a selection of two or more anchor points, the selected anchor points defining a bounding box within the image, wherein two or more control points are on and/or within the bonding box,
    subsequent to and in response to receiving the selection of the two or more anchor points, cause display of the bounding box, and
    cause movement of the two or more control points at the same time, based on a user input to deform the image.

16. The system of claim 15, wherein the image editing system is to:
    select a deformation type from a plurality of deformation types, based on a location relative to the bounding box from which a user input is initiated; and
    move the two or more control points based on the selected deformation type.

17. The system of claim 15, wherein the plurality of deformation types includes uniform scaling of the first portion, non-uniform scaling of the first portion in one direction, rotation of the first portion, and translation of the first portion.

18. A computer program product including one or more non-transitory machine-readable mediums encoded with instructions that when executed by one or more processors cause a process to be carried out for deforming an image, the process comprising:
    partitioning an image into a plurality of patches;
    causing display of the image and corner points of individual patches;
    receiving a selection of two or more corner points, the selected corner points defining a bounding box within the image, wherein individual ones of the selected two or more control points are on or within the bonding box;
    subsequent to and in response to the section of the two or more control points, causing display of the bounding box over the image; and
    performing a Bezier transformation of at least a portion of the image within the bounding box, based on a user input to perform the Bezier transformation.

19. The computer program product of claim 18, the process comprising:
    receiving the user input comprising a dragging action;
    determining a location from where the user input was initiated relative to the bounding box; and
    performing the Bezier transformation, based on the location from where the user input was initiated relative to the bounding box.

20. The computer program product of claim 18, wherein:
    each of a first patch within the bounding box and a second patch outside of the bounding box has a rectangular shape, prior to the Bezier transformation,
    the first patch has the rectangular shape after the Bezier transformation, and
    the second patch has a non-rectangular shape after the Bezier transformation.

\* \* \* \* \*